(12) United States Patent
Ikeuchi et al.

(10) Patent No.: US 9,003,140 B2
(45) Date of Patent: Apr. 7, 2015

(54) STORAGE SYSTEM, STORAGE CONTROL APPARATUS, AND STORAGE CONTROL METHOD

(75) Inventors: Kazuhiko Ikeuchi, Kawasaki (JP);
Hidejirou Daikokuya, Kawasaki (JP);
Takeshi Watanabe, Kawasaki (JP);
Norihide Kubota, Kawasaki (JP);
Atsushi Igashira, Yokohama (JP); Kenji Kobayashi, Kawasaki (JP); Ryota Tsukahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 236 days.

(21) Appl. No.: 13/585,100

(22) Filed: Aug. 14, 2012

(65) Prior Publication Data
US 2013/0054907 A1 Feb. 28, 2013

(30) Foreign Application Priority Data

Aug. 22, 2011 (JP) ................................. 2011-180125

(51) Int. Cl.
*G06F 12/00* (2006.01)
*G06F 3/00* (2006.01)
*G06F 11/20* (2006.01)
*G06F 11/10* (2006.01)

(52) U.S. Cl.
CPC ........ *G06F 11/2087* (2013.01); *G06F 11/1092* (2013.01)

(58) Field of Classification Search
None
See application file for complete search history.

(56) References Cited

U.S. PATENT DOCUMENTS

| | | | | |
|---|---|---|---|---|
| 5,519,844 A | * | 5/1996 | Stallmo | 711/114 |
| 5,651,133 A | * | 7/1997 | Burkes et al. | 711/114 |
| 5,974,515 A | * | 10/1999 | Bachmat et al. | 711/114 |
| 6,061,761 A | * | 5/2000 | Bachmat | 711/114 |
| 6,341,333 B1 | * | 1/2002 | Schreiber et al. | 711/114 |
| 2003/0229689 A1 | * | 12/2003 | Raghavan et al. | 709/223 |
| 2006/0212747 A1 | * | 9/2006 | Okamoto et al. | 714/6 |
| 2008/0120462 A1 | * | 5/2008 | Nehse | 711/114 |
| 2009/0055585 A1 | * | 2/2009 | Fernandes et al. | 711/114 |
| 2009/0300282 A1 | * | 12/2009 | Rowlands | 711/114 |

(Continued)

FOREIGN PATENT DOCUMENTS

| | | |
|---|---|---|
| EP | 0831484 A1 | 3/1998 |
| EP | 0866402 A | 9/1998 |
| JP | 10-260789 A | 9/1998 |

(Continued)

OTHER PUBLICATIONS

Japanese Office Action mailed Feb. 24, 2015 for corresponding Japanese Patent Application No. 2011-180125, with Partial English Translation, 5 pages.

*Primary Examiner* — Daniel Bernard
(74) *Attorney, Agent, or Firm* — Fujitsu Patent Center

(57) ABSTRACT

A storage system including first storage devices constituting a first logical storage area, second storage devices constituting a second logical storage area; and a storage control apparatus. The storage control apparatus manages the first and second logical storage areas so that the data stored in the first and second logical storage areas have redundancy, and parity data for the data stored in the second logical storage area are stored in parity storage areas arranged in part of the second storage devices. When part of the first storage devices constituting part of the first logical storage area fail, the storage control apparatus generates part of the data stored, before the failure, in the part of the first storage devices, and stores the generated part of the data in at least part of the second parity storage areas in the second logical storage area.

19 Claims, 18 Drawing Sheets

(56) References Cited

U.S. PATENT DOCUMENTS

2010/0325345 A1* 12/2010 Ohno et al. .................... 711/103
2013/0031563 A1* 1/2013 Skowron et al. .............. 718/105
2013/0036340 A1* 2/2013 Kidney et al. ................. 714/770

FOREIGN PATENT DOCUMENTS

| JP | 2008-197886 A | 8/2008 |
| WO | 96/42083 A1 | 12/1996 |
| WO | 2007/057339 | 5/2007 |

* cited by examiner

Copying Back to RLU#01 and State 4

| DISK#00 | #01 | #02 | #03 | #04 | #10 | #11 | #12 | #13 | #14 |
|---|---|---|---|---|---|---|---|---|---|
| D0 | D1 | D2 | P0 | P'0 | D'0 | D'1 | D'2 | P'0 | |
| D4 | D5 | P1 | Q'1 | D3 | D'4 | D'5 | P'1 | Q'1 | |
| D8 | P2 | D'6 | D6 | D7 | D'8 | P'2 | Q'2 | D'6 | |
| ⋮ | | | | | ⋮ | | | | |
| D(n-3) | D(n-2) | D(n-1) | P(m-1) | P'(m-1) | D'(n-3) | D'(n-2) | D'(n-1) | P'(m-1) | |

RLU#00(RAID-5)
RLU#01(RAID-5)

⬇ Separate RLUs

Data Restoration and State 5

| DISK#00 | #01 | #02 | #03 | #04 | #10 | #11 | #12 | #13 | #14 |
|---|---|---|---|---|---|---|---|---|---|
| D0 | D1 | D2 | P0 | Q0 | D'0 | D'1 | D'2 | P'0 | Q'0 |
| D4 | D5 | P1 | Q1 | D3 | D'4 | D'5 | P'1 | Q'1 | D'3 |
| D8 | P2 | Q2 | D6 | D7 | D'8 | P'2 | Q'2 | D'6 | D'7 |
| ⋮ | | | | | ⋮ | | | | |
| D(n-3) | D(n-2) | D(n-1) | P(m-1) | Q(m-1) | D'(n-3) | D'(n-2) | D'(n-1) | P'(m-1) | Q'(m-1) |

RLU#00
RLU#01

⬇ Change RAID Levels

State 6 (Normal State)

| DISK#00 | #01 | #02 | #03 | #04 | #10 | #11 | #12 | #13 | #14 |
|---|---|---|---|---|---|---|---|---|---|
| D0 | D1 | D2 | P0 | Q0 | D'0 | D'1 | D'2 | P'0 | Q'0 |
| D4 | D5 | P1 | Q1 | D3 | D'4 | D'5 | P'1 | Q'1 | D'3 |
| D8 | P2 | Q2 | D6 | D7 | D'8 | P'2 | Q'2 | D'6 | D'7 |
| ⋮ | | | | | ⋮ | | | | |
| D(n-3) | D(n-2) | D(n-1) | P(m-1) | Q(m-1) | D'(n-3) | D'(n-2) | D'(n-1) | P'(m-1) | Q'(m-1) |

RLU#00(RAID-6)
RLU#01(RAID-6)

FIG. 7

FIG. 12

FIG. 13
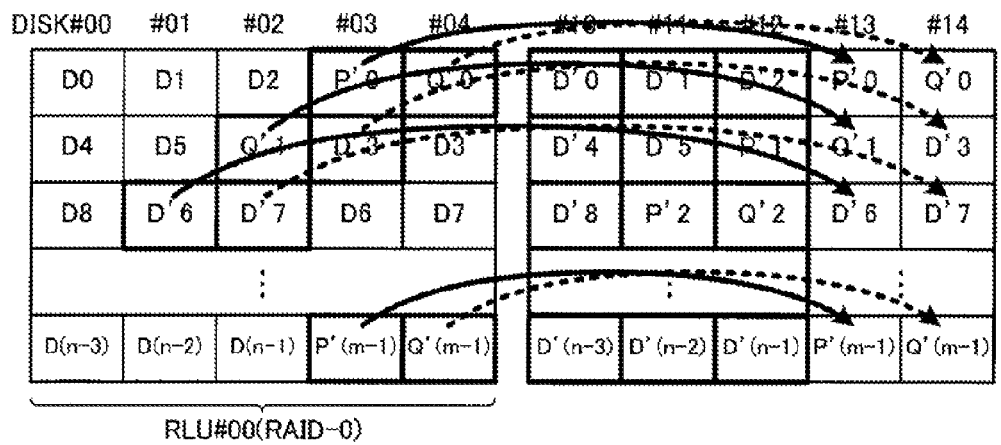
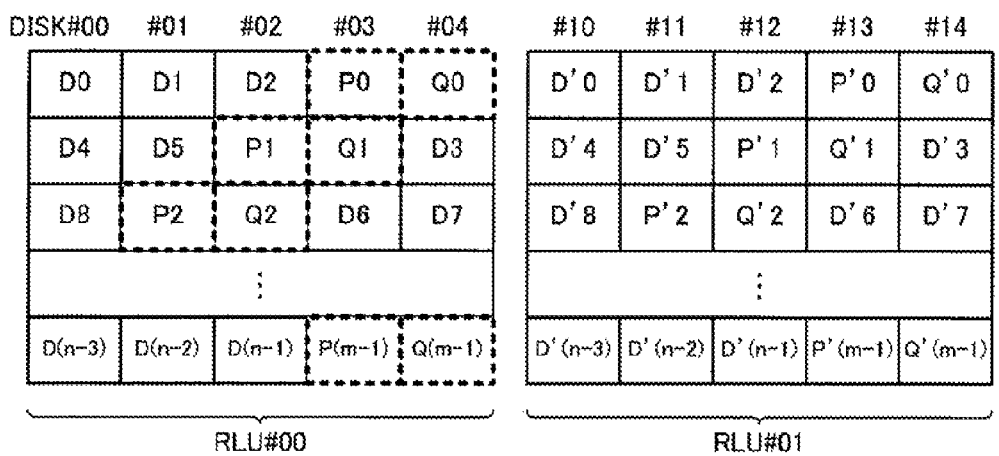
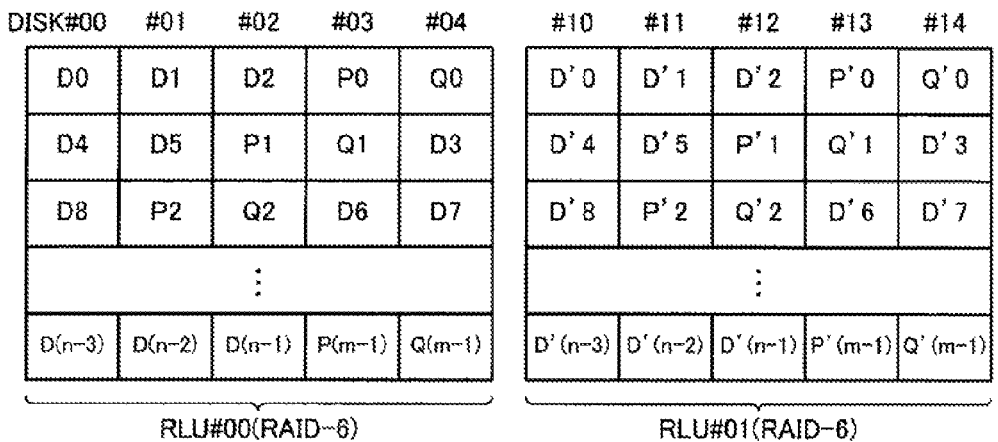

STORAGE SYSTEM, STORAGE CONTROL APPARATUS, AND STORAGE CONTROL METHOD

CROSS-REFERENCE TO RELATED APPLICATION

This application is based on and claims the benefits of priority from the prior Japanese Patent Application No. 2011-180125, filed on Aug. 22, 2011, the contents of which are incorporated herein by reference.

FIELD

The embodiment discussed herein relates to storage systems, storage control apparatuses, and storage control methods.

BACKGROUND

Currently, storage systems using multiple storage devices such as HDDs (Hard Disk Drives) are widely used. In such storage systems, the safety of stored data is enhanced by controlling data recording in such a manner that the data are redundantly stored in more than one storage device by using the RAID (Redundant Arrays of Inexpensive Disks) technology.

In addition, in the storage systems in which data are redundantly stored, when a storage device fails, data stored in the failed storage device are rebuilt in another storage device. Such processing is called rebuilding. When rebuilding is performed, the redundancy is restored.

Incidentally, many storage systems are provided with a standby storage device called hot spare, and the rebuilding is performed by using the hot spare in many cases. On the other hand, according to a rebuilding technique proposed for the storage systems not containing the hot spare, when a storage device belonging to a first RAID group fails, one of storage devices belonging to a second RAID group (which is configured to redundantly store data) is separated from the second RAID group, and rebuilding is performed by using the separated storage device. (See, for example, Japanese Laid-open Patent Publications Nos. 2008-197886 and 10-260789.)

In the case where one of the storage devices belonging to the second RAID group is separated from the second RAID group and rebuilding is performed by using the separated storage device as above, the use of the second RAID group is resumed after the RAID level is changed and the data redundancy is lowered. Further, in the case where the data in the second RAID group are managed in such a manner that the parity data are distributedly recorded in accordance with, for example, RAID 5 or RAID 6, the data are rebuilt and rearranged when the RAID level is changed. However, the processing for rebuilding and rearrangement of the data may affect the processing for access to the storage devices in response to I/O (In/Out) requests from a host apparatus, and lower the speed of the processing for access.

SUMMARY

According to an aspect, there is provided a storage system including first storage devices constituting a first logical storage area, second storage devices constituting a second logical storage area; and a storage control apparatus. The storage control apparatus is configured to perform a procedure including: controlling processing for accessing first data stored in the first logical storage area and second data stored in the second logical storage area; and managing the first logical storage area and the second logical storage area in such a manner that the first data stored in the first logical storage area and the second data stored in the second logical storage area have redundancy, and first parity data for the first data are stored in first parity storage areas which are distributedly arranged in more than one of the first storage devices, and second parity data for the second data are stored in second parity storage areas which are distributedly arranged in more than one of the second storage devices. Further, when failure occurs in one or more of the first storage devices constituting part of the first logical storage area, the storage control apparatus generates part of the first data which are stored, before the failure, in the one or more of the first storage devices, and stores the part of the first data in at least part of the second parity storage areas in the second logical storage area.

The objects and advantages of the invention will be realized and attained by means of the elements and combinations particularly pointed out in the claims.

It is to be understood that both the forgoing general description and the following detailed description are exemplary and explanatory and are not restrictive of the invention.

BRIEF DESCRIPTION OF DRAWINGS

FIGS. 5 and 6 illustrate examples of states of RLUs and operations on the RLUs in a procedure performed when hard disk drives (HDDs) fail in the second embodiment;

FIG. 7 illustrates examples of states of RLUs in a comparison procedure performed when HDDs fail, for comparison with the second embodiment;

FIGS. 12 and 13 illustrate examples of states of RLUs and operations on the RLUs in a procedure performed when hard disk drives (HDDs) fail in a third embodiment;

DESCRIPTION OF EMBODIMENTS

The embodiments will be explained below with reference to the accompanying drawings, wherein like reference numbers refer to like elements throughout.

1. First Embodiment

Figure 1:
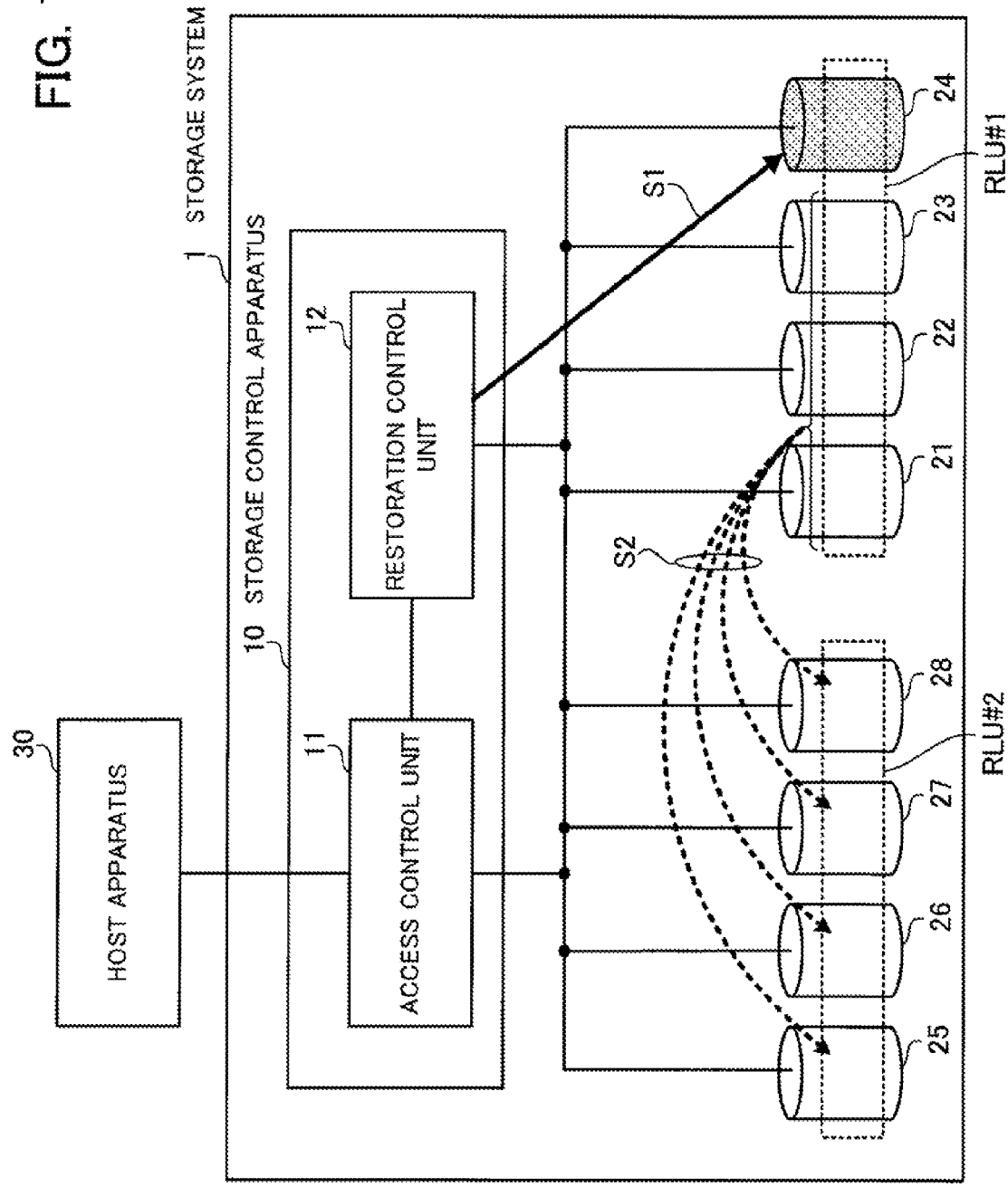
FIG. 1 illustrates an example of a storage system according to a first embodiment.

FIG. 1 illustrates the storage system according to the first embodiment. The storage system 1 contains a storage control apparatus 10 and a plurality of storage devices 21 to 28. The storage devices 21 to are nonvolatile storage devices such as HDDs, SSDs (Solid-State Drives), and the like. In addition, a host apparatus 30 is connected to the storage control apparatus 10. The storage control apparatus 10 controls operations for accessing data in the storage devices 21 to 28. For example, the storage control apparatus 10 accesses one or more of the storage devices 21 to 28 in response to an I/O request from the host apparatus 30. The storage control apparatus 10 contains an access control unit 11 and a restoration control unit 12. The functions of the access control unit 11 and the restoration control unit 12 are realized when a CPU (Central Processing Unit) contained in the storage control apparatus 10 executes a predetermined program.

The access control unit 11 manages, for each of a plurality of logical storage areas, the operations for accessing the storage devices 21 to 28, where each of the plurality of logical storage areas is constituted by ones of physical storage areas in the storage devices to 28. In the example used in the following explanations on the second embodiment, a first logical storage area RLU#1 constituted by physical storage areas in the storage devices 21 to 24 and a second logical storage area RLU#2 constituted by physical storage areas in the storage devices 25 to 28 are defined, where RLU stands for RAID logical unit. (Hereinafter, the first logical storage area RLU#1 is simply referred to as RLU#1, and the second logical storage area RLU#2 is simply referred to as RLU#2.) The access control unit 11 manages RLU#1 in such a manner that redundancy is added to data by use of parity and parity data are distributedly stored in more than one storage device. For example, the access control unit 11 manages RLU#1 in accordance with RAID 5 and RAID 6. Similarly, the access control unit 11 manages RLU#2 in such a manner that redundancy is added to data by use of parity and parity data are distributedly stored in more than one storage device.

The restoration control unit 12 performs the following operations when one of the storage devices constituting a logical storage area fails. In the example used in the following explanations, it is assumed that the storage device 24 constituting RLU#1 fails.

In step 1, the restoration control unit 12 detects a failure in the storage device 24, which constitutes RLU#1. Then, in step S2, the restoration control unit 12 generates part of the data in RLU#1 which have been stored in the failed storage device 24 before the failure, and stores the generated data (which is hereinafter referred to as the rebuilt data for RLU#1) in parity storage areas in RLU#2, where the parity data in RLU#2 have been stored in the parity storage areas in RLU#2 before the storing of the generated data. As mentioned before, the parity data in RLU#2 have been distributedly stored in the storage devices 25 to 28. Therefore, the rebuilt data for RLU#1 are also distributedly stored in the storage devices 25 to 28 in step S2.

The redundancy in the data in RLU#1 may be restored by the above operations in step S2. On the other hand, RLU#2 is not separated on the storage-device basis, and only the parity storage areas in RLU#2 become unable to be used by RLU#2. That is, the data in RLU#2 other than the parity data remain unchanged. Therefore, it is unnecessary to rebuild or rearrange the data other than the parity data in RLU#2, and the data stored in RLU#2 may be easily used.

Since the rebuilding or rearrangement of the data in RLU#2 is unnecessary, the processing burden when the storage device 24 fails is reduced compared with the conventional technique in which the rebuilding or rearrangement of the data in RLU#2 is necessary. Therefore, it is possible to reduce the influence, of the processing performed when the storage device 24 fails, on the access processing performed by the access control unit 11 in response to I/O requests from the host apparatus 30, and to prevent serious lowering of the speed of the access processing in response to the I/O requests from the host apparatus 30.

In addition, when the restoration control unit 12 stores the rebuilt data for RLU#1 in the parity storage areas in RLU#2, the restoration control unit 12 may make the access control unit 11 manage RLU#1 and RLU#2 as follows.

The restoration control unit 12 logically incorporates with RLU#1 the parity storage areas in RLU#2 as substitutes for the storage areas in the failed storage device 24, and resumes the management of RLU#1 with the original degree of redundancy of the data in RLU#1. Therefore, the access control unit 11 may control the processing for accessing the data in RLU#1 after the failure in the storage device 24 in a similar manner to the control of the processing performed before the failure in the storage device 24 except that part of data writing positions or data reading positions are changed. In addition, the data in the storage devices 21 to 23 are not rearranged during the period until the access control unit 11 becomes able to resume the management of RLU#1 with the original degree of redundancy of the data in RLU#1. Therefore, the processing burden imposed on the storage control apparatus 10 during the above period is reduced, so that it is possible to prevent serious lowering of the speed of the access processing in response to the I/O requests from the host apparatus 30.

Further, the restoration control unit 12 makes the access control unit 11 resume the management of RLU#2 under the condition that the parity storage areas are logically separated from RLU#2 and the degree of redundancy in the data in RLU#2 is lowered. That is, the access control unit 11 changes the RAID level of RLU#2, and resumes the management of RLU#2. Since the data in the storage areas in RLU#2 other than the parity storage areas remain unchanged as mentioned before, the storage control apparatus 10 may resume processing for accessing the data in RLU#2 without rebuilding or rearrangement of the data in RLU#2.

Furthermore, since the data in the storage areas in RLU#2 other than the parity storage areas remain unchanged, it is possible to read out from either of the storage devices 25 to 28 part of the data in RLU#2 which is requested by the host apparatus 30 to be read out, without data calculation. Therefore, it is possible to prevent lowering of the speed of data reading from RLU#2 in response to a request from the host apparatus 30.

2. Second Embodiment

The second embodiment is explained below.

2.1 Configuration of Storage System

Figure 2:
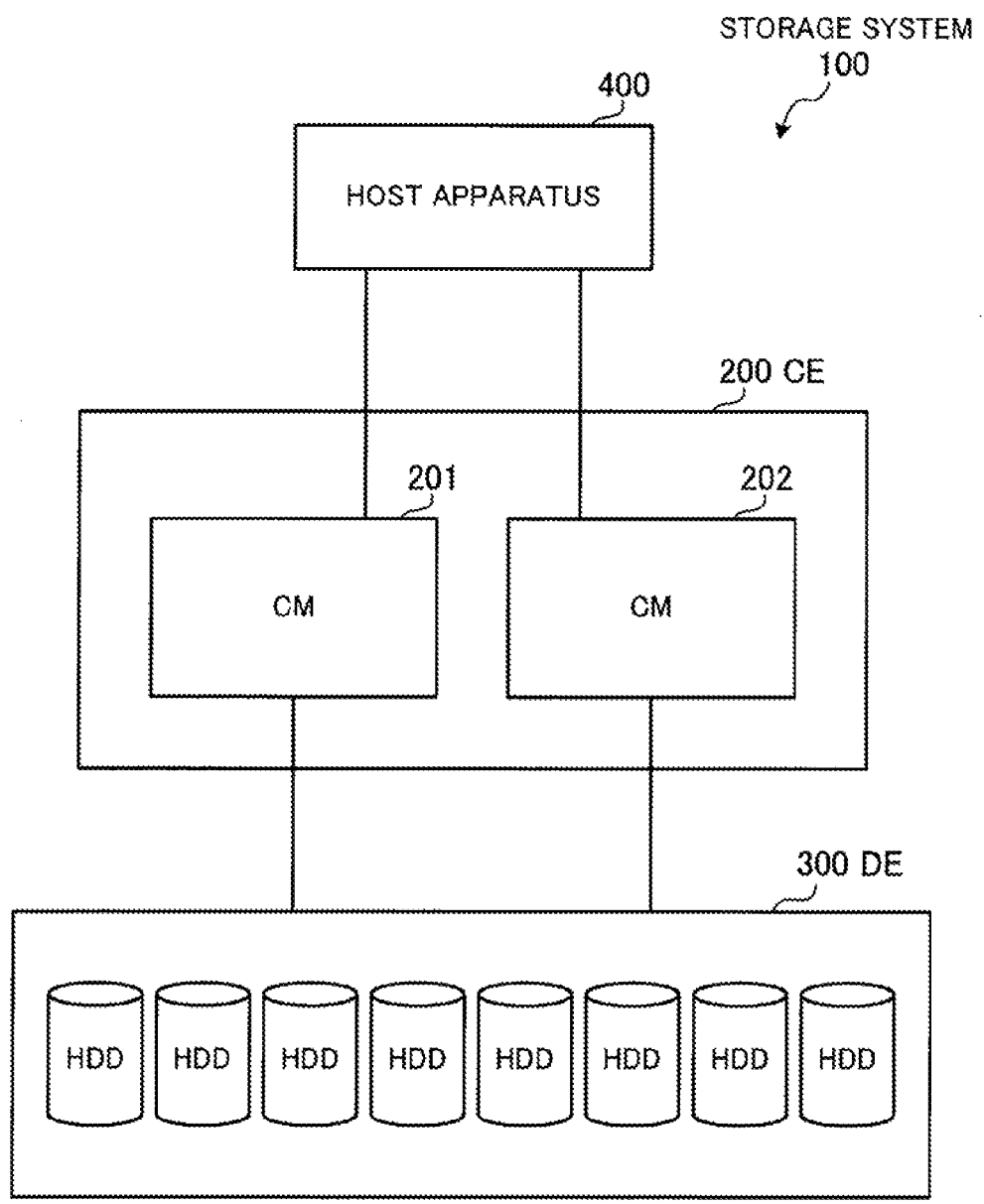
FIG. 2 illustrates an example of a storage system according to a second embodiment.

FIG. 2 illustrates an example of a storage system according to the second embodiment. The storage system 100 of FIG. 2 contains a controller enclosure (CE) 200 and a drive enclosure (DE) 300. In addition, a host apparatus 400 is connected to the CE 200.

The CE 200 contains controller modules (CMs) 201 and 202. Each of the CMs 201 and 202 performs, in response to a request from the host apparatus 400, an operation of writing or reading data in and from multiple storage devices in the DE 300. In addition, the CMs 201 and 202 manage, in accordance with RAID, physical storage areas realized by the storage devices in the DE 300, and controls access to the physical storage areas.

The CMs 201 and 202 may be connected through, for example, a router. Alternatively, the CE 200 may contain only one CM or more than two CMs. However, in the case where more than one CM is arranged in the CE 200, redundancy is added to the system for accessing the DE 300, so that the reliability of the access control processing is increased.

The DE 300 contains the multiple storage devices which may be accessed by the CMs 201 and 202. In the present embodiment, the DE 300 is a disk array constituted by multiple HDDs as the storage devices. Alternatively, other types of nonvolatile storage devices such as SSDs may be used as the storage devices in the DE 300.

In response to a manipulation by a user, the host apparatus 400 requests the CMs 201 and 202 to access the HDDs in the DE 300. For example, in response to a manipulation by a user, the host apparatus 400 may perform an operation of reading data from the HDDs in the DE 300 or an operation of writing data in the HDDs in the DE 300 through the CM 201 or 202. The CMs 201 and 202 have similar constructions and may perform similar operations. Therefore, only the CM 201 is explained below.

2.2 Hardware of CM

Figure 3:
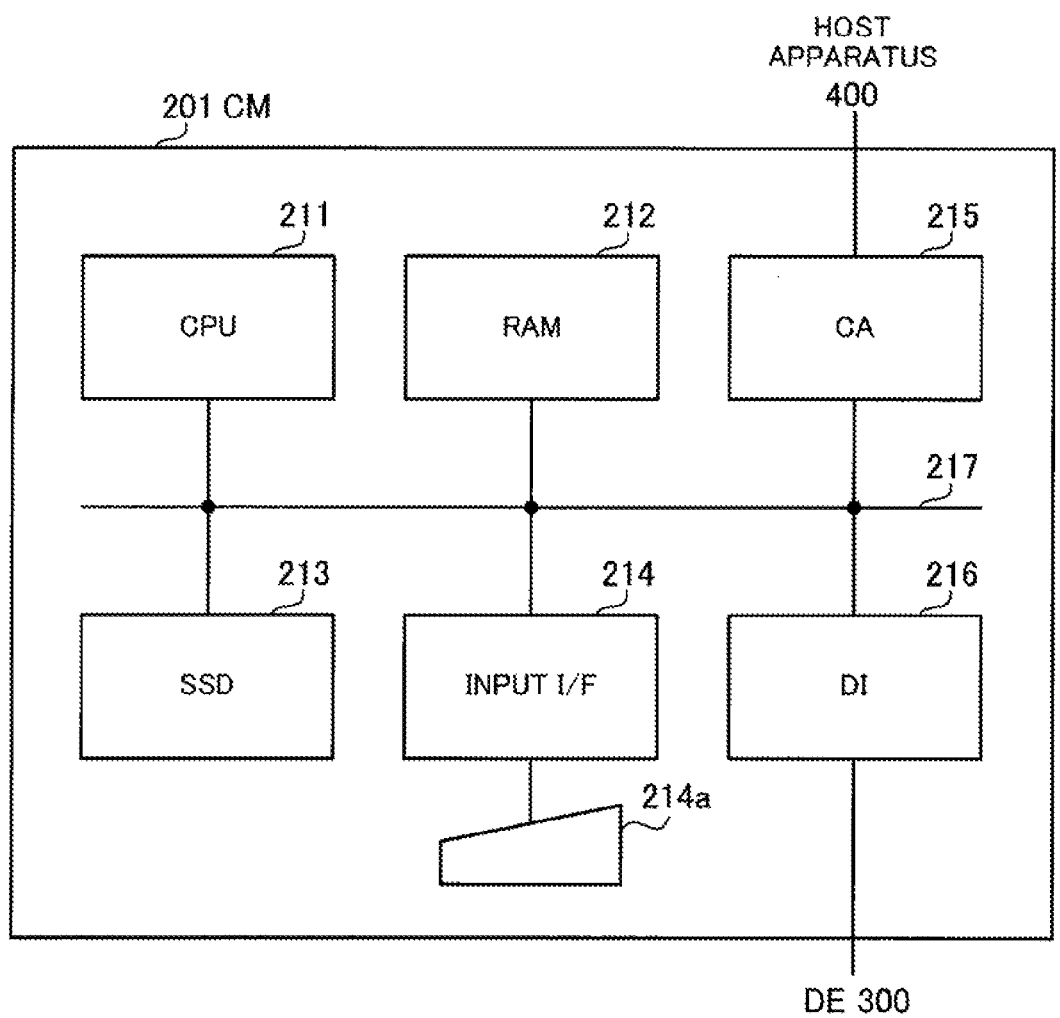
FIG. 3 illustrates an example of a hardware construction of a controller module (CM) in the second embodiment.

FIG. 3 illustrates an example of a hardware construction of the CM 201 in the second embodiment. The entire CM 201 is controlled by a CPU 211. A RAM (random access memory) 212 and more than one peripheral device are connected to the CPU 211 through a bus 217. The RAM 212 is used as a main storage of the CM 201, and temporarily stores at least portions of programs executed by the CPU 211 and various data needed in processing in accordance with the programs. For example, an SSD 213, an input interface (I/F) 214, a channel adapter (CA) 215, and a drive interface (DI) 216 are connected to the CPU 211 as the more than one peripheral device.

The SSD 213 is used as a secondary storage of the CM 201, and stores programs to be executed by the CPU 211 and various data needed in execution of the programs. Alternatively, another type of nonvolatile storage device, for example, an HDD may be used as the secondary storage.

An input device 214a having operation keys or the like is connected to the input I/F 214. The input I/F 214 outputs to the CPU 211 signals corresponding to manipulation inputs into the input device 214a. The CA 215 performs interface processing for transmitting and receiving data to and from the host apparatus 400 in accordance with, for example, the FC (Fibre Channel) standard. The DI 216 performs interface processing for transmitting and receiving data to and from the DE 300 in accordance with, for example, the SAS (Serial Attached SCSI) standard. (SCSI stands for Small Computer System Interface.)

2.3 Processing Functions of CM

Figure 4:
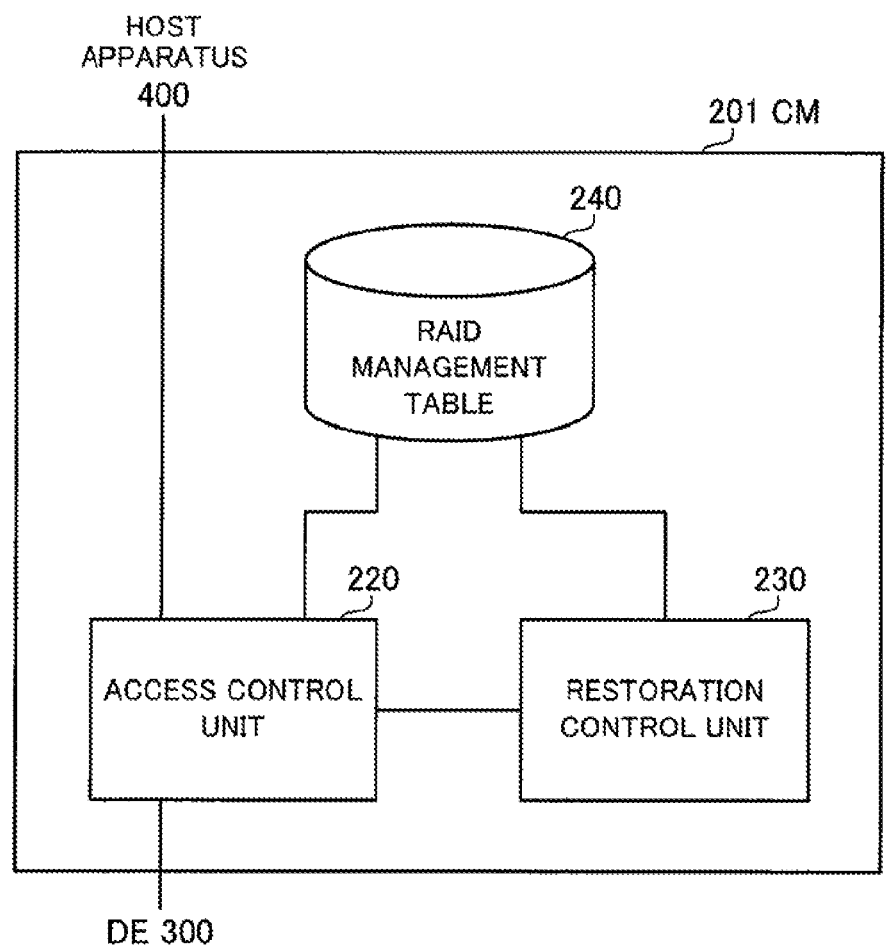
FIG. 4 illustrates examples of processing functions of one of the CMs in the second embodiment.

FIG. 4 illustrates examples of processing functions of the CM 201 in the second embodiment. The CM 201 contains an access control unit 220 and a restoration control unit 230. The functions of the access control unit 220 and the restoration control unit 230 are realized, for example, by the CPU 211 in the CM 201 executing a predetermined program. In addition, a storage device in the CM 201, for example, the SSD 213 stores a RAID management table 240.

The access control unit 220 accesses the HDDs in the DE 300 in response to I/O requests from the host apparatus 400. For example, when the access control unit 220 receives a data read request from the host apparatus 400, the access control unit 220 reads out requested data from predetermined one or more of the HDDs in the DE 300, and transmits the requested data to the host apparatus 400. On the other hand, when the access control unit 220 receives a data write request (together with data requested to be written) from the host apparatus 400, the access control unit 220 writes the received data, in predetermined one or more of the HDDs in the DE 300.

In addition, the access control unit 220 manages in accordance with the RAID technique the data stored in the HDDs in the DE 300 on the basis of information which is set in the RAID management table 240. The access control unit 220 manages data stored in each RAID logical unit (RLU) at a predetermined RAID level. Each RLU is a logical storage area constituted by physical storage areas in multiple storage devices which are mounted in the DE 300, and is also called a RAID group. The access control unit 220 may manage each RLU in accordance with RAID 0, RAID 5, or RAID 6.

The RAID management table 240 holds, for each RLU, an identification number of the RLU, a RAID level applied to the RLU, information indicating HDDs belonging to the RLU, information indicating the control status of the RLU, and other information. The access control unit 220 determines HDDs in which data is to be stored, a RAID level to be applied to the storing, and one or more other conditions by reference to the RAID management table 240.

In addition, when occurrence of failure in one or more of the HDDs in the DE 300 is detected, the access control unit 220 sends to the restoration control unit 230 information indicating the occurrence of the failure and information identifying the one or more failed HDDs. Further, in some cases, the access control unit 220 accesses the HDDs in the DE 300 in response to a request from the restoration control unit 230. For example, the access control unit 220 performs rebuilding processing, copy-back processing, or other processing in response to a request from the restoration control unit 230. In the rebuilding processing, data which have been stored in the one or more failed HDD are rebuilt and stored in other HDDs. The copy-back processing is performed after the one or more failed HDD are replaced, and the data stored in the other HDDs by the rebuilding processing are written back to one or more HDD which have replaced the one or more failed HDD.

When the access control unit 220 detects failure in one or more of the HDDs in the DE 300, the restoration control unit 230 makes the access control unit 220 perform the rebuilding processing. As explained later, the restoration control unit 230 may select, as areas for storing the data in the rebuilding processing, one or more hot-spare HDDs or parity storage areas among the storage areas constituting one of RLUs other than the RLU to which the one or more failed HDDs belong. In the case where parity storage areas among the storage areas constituting one of RLUs other than the RLU to which the one or more failed HDDs belong are chosen as the areas for storing the data in the rebuilding processing, the RAID levels in both of the RLU to which the one or more failed HDDs belong and the one of RLUs other than the RLU to which the one or more failed HDDs belong are changed without substantial data rearrangement. The restoration control unit 230 controls the rebuilding processing, the copy-back processing, and the processing for changing the RAID levels by updating the information in the RAID management table 240.

An example of processing in the case where parity storage areas among the storage areas constituting one of RLUs other than the RLU to which the one or more failed HDDs belong are chosen as the areas for storing the data in the rebuilding processing is explained below. In the example explained below, two HDDs belonging to one of the RLUs used in accordance with RAID 6 fail, and the data stored in one of the two failed HDDs are rebuilt and stored in parity storage areas in another of the RLUs which has been used in accordance with RAID 6 before the rebuilding processing, so that both of the RLU to which the failed HDDs belong and the RLU in which the data which have been stored in the one of the failed HDDs before the failure are stored in the parity storage areas are enabled to be temporarily used in accordance with RAID 5.

Further, when the failed HDDs are replaced, the restoration control unit 230 performs processing for restoring, to the normal state (i.e., the state before the occurrence of the failure in the HDDs), both of the RLU to which the failed HDDs belong and the RLU in which the data which have been stored in the one of the failed HDDs before the failure are temporarily stored by the rebuilding processing.

In the following explanations, the disk numbers "DISK#xx" are assigned to the HDDs for identifying the HDDs, respectively, the RLU numbers "RLU#yy" are assigned to the RLUs for identifying the RLUs, respectively, the HDDs having the disk numbers "DISK#xx" may be simply referred to as DISK#xx, and the RLUs having the RLU numbers "RLU#yy" may be simply referred to as RLU#yy.

2.4 Operations on RLUs

Figure 5:
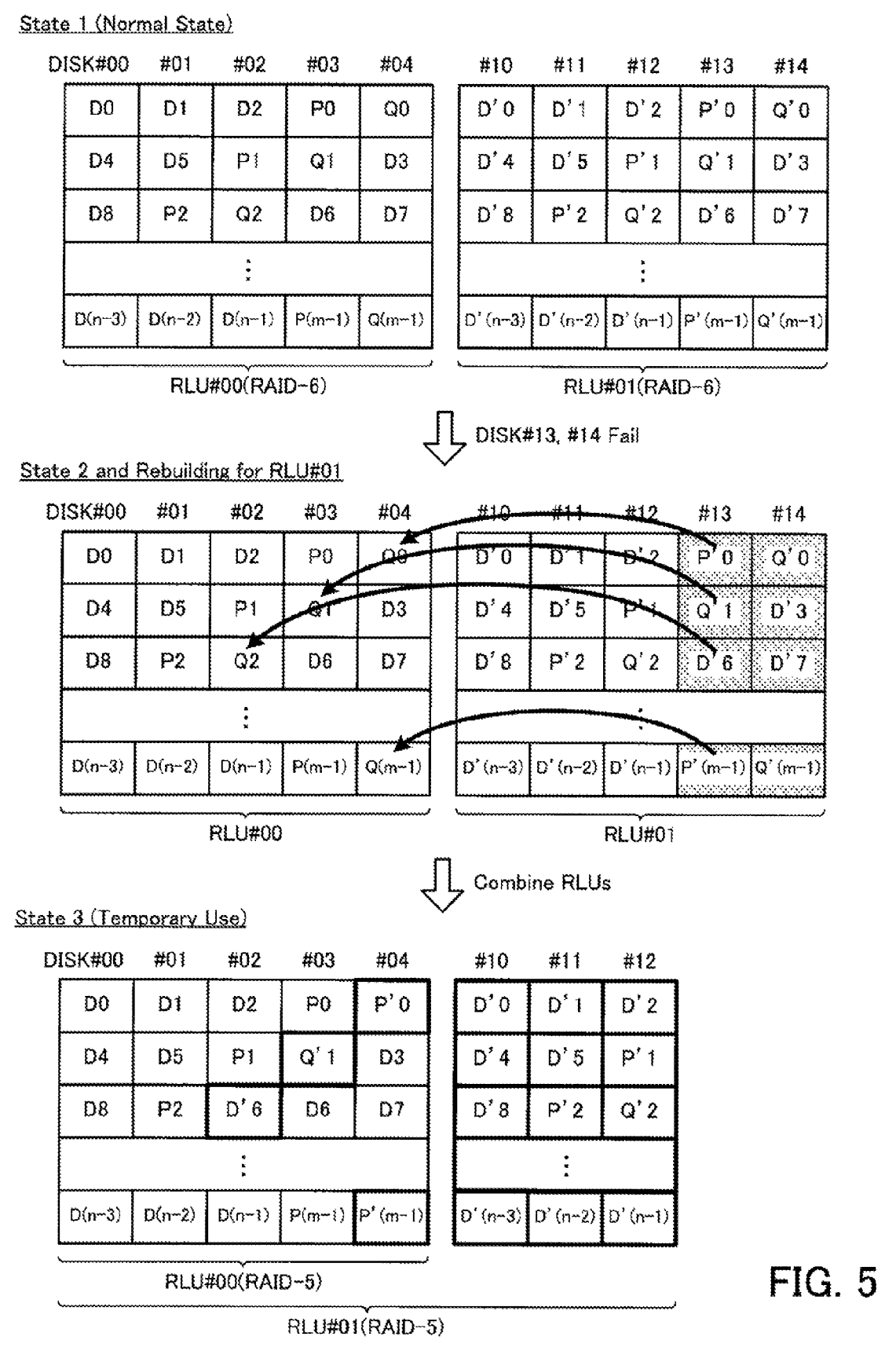

FIGS. 5 and 6 illustrate examples of states of the RLUs and operations on the RLUs in a procedure performed according to the second embodiment when two hard disk drives (HDDs) fail. Specifically, FIG. 5 illustrates an example of a state in which both of RLU#00 and RLU#01 normally operate (as the state 1), an example of a state in which two of the HDDs constituting RLU#01 fail (as the state 2), and an example of a state after rebuilding processing according to the present embodiment is performed for temporary use of RLU#00 and RLU#01 (as the state 3).

Both of RLU#00 and RLU#01 are normally operating in the state 1 as illustrated in FIG. 5. RLU#00 is constituted by physical storage areas in DISK#00 to DISK#04, and managed in accordance with RAID 6. RLU#01 is constituted by physical storage areas in DISK#10 to DISK#14, and is also managed in accordance with RAID 6. In addition, it is assumed that data D0 to D(n−1), P-parity data P0 to P(m−1), and Q-parity data Q0 to Q(m−1) are stored in RLU#00, and data D' 0 to D' (n−1), P-parity data P' 0 to P' (m−1), and Q-parity data Q' 0 to Q' (m−1) are stored in RLU#01, where each of n and m is an integer equal to or greater than one.

The data D0 to D(n−1) are data blocks having an identical length and being generated by dividing data which are requested by the host apparatus 400 to be written in RLU#00, and the data D'0 to D' (n−1) are data blocks having an identical length and being generated by dividing data which are requested by the host apparatus 400 to written in RLU#01.

The P-parity data P0 to P(m−1) and the P-parity data P' 0 to P' (m−1) are parity data which are generated in a certain manner of calculation, and the Q-parity data Q0 to Q(m−1) and the Q-parity data Q' 0 to Q' (m−1) are parity data which are generated in a manner of calculation different from the above manner of calculation of the P-parity data. For example, the P-parity data P0 is calculated as an exclusive OR of the data D0 to D2, and the Q-parity data Q0 is calculated as an exclusive OR of weighted values of the data D0 to D2.

The maximum number n of the data blocks stored in RLU#00 needs not be identical to the maximum number n of the data blocks stored in RLU#01. In addition, the maximum number m of the P-parity data blocks or the Q-parity data blocks stored in RLU#00 (i.e., the maximum number of stripes in RLU#00) needs not be identical to the maximum number m of the P-parity data blocks or the Q-parity data blocks stored in RLU#01 (i.e., the maximum number of stripes in RLU#01). However, in order to enable processing performed in the state 2 explained below and illustrated in FIG. 5, the maximum number m of the P-parity data or the Q-parity data stored in RLU#00 needs to be equal to or greater than the maximum number m of the P-parity data or the Q-parity data stored in RLU#01.

Assume that DISK#13 and DISK#14 belonging to RLU#01 fail as indicated by hatching in the illustration of the state 2 in FIG. 5. When DISK#13 and DISK#14 fail, the data redundancy in RLU#01 is lost. The restoration control unit 230 selects a triply-redundant one of the RLUs other than RLU#01 (RLU#00 in this example), and combines the selected RLU (RLU#00) with the RLU in which the HDDs fail (RLU#01), where the triply-redundant one means an RLU managed in accordance with RAID 6, and the combining of RLUs means logically incorporating physical storage areas in a normally operating RLU (as substitutes for the storage areas in the failed HDDs) with the physical storage areas in the RLU in which the HDDs fail. Thus, the restoration control unit 230 enables temporary use of each RLU in such a manner that the data in each RLU is operated in accordance with RAID 5, which realizes double redundancy.

Specifically, when DISK#13 and DISK#14 belonging to RLU#01 fail, the restoration control unit 230 makes the access control unit 220 start processing for rebuilding of RLU#01, where physical storage areas for the P parity or the Q parity in RLU#00 are used for storing data in the rebuilding processing for RLU#01 as indicated by the arrows in the illustration of the state 2 in FIG. 5. In the example of FIG. 5, the restoration control unit 230 requests the access control unit 220 to rebuild the data which have been stored in DISK#13 before the failure, and to store the rebuilt data in the storage areas for the Q parity in RLU#00. For example, the access control unit 220 rebuilds, by calculation based on the data D' 0 to D' 2, the P-parity data P' 0 which has been stored in DISK#13, and overwrites the storage area for the Q-parity data Q0 in RLU#00 with the P-parity data P' 0 rebuilt as above. In addition, the access control unit 220 rebuilds, by calculation based on the data D' 4 to D' 5 and the P parity P' 1, the Q-parity data Q' 1 which has been stored in DISK#13, and overwrites the storage area for the Q-parity data Q1 in RLU#00 with the Q-parity data Q' 1 rebuilt as above.

When the rebuilding processing for RLU#01 is completed, the restoration control unit 230 brings RLU#00 and RLU#01 into a combined state (the state 3) as illustrated in FIG. 5. That is, the restoration control unit 230 logically separates the failed DISK#13 and DISK#14 from RLU#01. In addition, the restoration control unit 230 logically separates from RLU#00 the Q-parity storage areas storing the rebuilt data for RLU#01, and logically incorporates the logically separated Q-parity storage areas with RLU#01.

The physical storage areas constituting RLU#01 in the state 3 are encircled by the bold lines in FIG. 5. The restoration control unit 230 makes the access control unit 220 temporarily operate RLU#01 in which the Q-parity storage areas in RLU#00 are logically incorporated, in a management manner equivalent to RAID 5. In addition, the restoration control unit 230 also makes the access control unit 220 temporarily operate RLU#00 excluding the Q-parity storage areas, in a management manner equivalent to RAID 5.

According to the processing for data rebuilding and RLU combining explained above, even when two HDDs in RLU#01 fail, the data redundancy may be restored to double redundancy. In addition, since RLU#00, which has been managed in accordance with RAID 6 before the rebuilding processing, is selected as the storage areas for storing the rebuilt data for RLU#01, the data in RLU#00 remain redundant even after the processing for data rebuilding and RLU combining, although the data redundancy in RLU#00 is lowered. Therefore, the data in the entire storage area constituted by RLU#00 and RLU#01 remain redundant even after the processing for data rebuilding and RLU combining.

FIG. 6 illustrates an example of a state after copy-back processing according to the present embodiment is performed (as the state 4), an example of a state after data-restoration processing according to the present embodiment is performed (as the state 5), and an example of a state in which the RAID-6 level of each of RLU#00 and RLU#01 is restored for normal use (as the state 6).

After the failed HDDs DISK#13 and DISK#14 are respectively replaced with new HDDs, copy-back processing to RLU#01 is performed as indicated by the arrows in the illustration of the state 4 in FIG. 6, so that RLU#00 and RLU#01 transitions from the state 3 illustrated in FIG. 5 to the state 4 as illustrated in FIG. 6 (i.e., the data temporarily stored in the storage areas in RLU#00 are copied back to the storage areas in DISK#13). Specifically, the restoration control unit 230 makes the access control unit 220 duplicate on the replacement of DISK#13 the data temporarily stored in the Q-parity storage areas in RLU#00. That is, the access control unit 220 reads out the data block in the Q-parity storage area corresponding to each stripe number in RLU#00, and writes the data block in a position corresponding to the same stripe number in the replacement of DISK#13 in RLU#01.

When the copy-back processing is completed, the restoration control unit 230 makes RLU#00 and RLU#01 transition from the combined state to a separated state. At this time, the restoration control unit 230 incorporates the replacements of DISK#13 and DISK#14 into RLU#01, and logically separates the Q-parity storage areas in RLU#00 from RLU#01. In addition, the restoration control unit 230 logically incorporates the Q-parity storage areas in RLU#00 into RLU#00 again. Thus, RLU#00 and RLU#01 are separated (as indicated in the illustration of the states in FIG. 6).

After the logical separation of RLU#00 and RLU#01, the restoration control unit 230 makes the access control unit 220 perform data-restoration processing for restoring the RAID level of each of RLU#00 and RLU#01 to RAID 6. Specifically, the restoration control unit 230 requests the access control unit 220 to recalculate the Q-parity data in RLU#00 and overwrite the Q-parity storage areas in RLU#00 with the recalculated Q-parity data. For example, the access control unit 220 recalculates the data of the Q parity Q0 by using the data blocks D0 to D2 stored in DISK#00 to DISK#02, and overwrites the data block in DISK#04 (originally allocated for the Q parity Q0) in the same stripe as the data blocks D0 to D2 with the calculated data of the Q parity Q0. (In the illustration of the state 5 in FIG. 6, the data blocks on which the data restoration processing is performed are each encircled by dashed lines.)

In addition, the restoration control unit 230 makes the access control unit 220 rebuild the data to be stored in DISK#14 in RLU#01 and store the rebuilt data in DISK#14. For example, the access control unit 220 recalculates the data of the Q parity Q' 0 on the basis of the data blocks D' 0 to D' 2, and stores the calculated data of the Q parity Q' 0 in the data block in DISK#14 (originally allocated for the Q parity Q' 0) in the same stripe as the data blocks D' 0 to D' 2. Further, the access control unit 220 rebuilds the data D' 3 on the basis of the data D' 4 and D' 5 and the P parity P' 1 (or the Q parity Q' 1), and stores the rebuilt data D' 3 in the data block in DISK#14 (originally allocated for the data block D' 3) in the same stripe as the data blocks D' 4 and D' 5. Thus, the data blocks in DISK#14 in RLU#01 are restored as indicated in the illustration of the state 5 in FIG. 6 (where the restored data blocks are indicated by dashed lines).

When the data restoration is completed, the restoration control unit 230 changes the RAID level of each of RLU#00 and RLU#01 to RAID 6, and restores each of RLU#00 and RLU#01 to the normal state as indicated in the illustration of the state 6 in FIG. 6, which is identical to the state 1 illustrated in FIG. 5.

An example of a comparison procedure which may be performed when two of RLU#01 fail and is different from the above procedure according to the present embodiment is explained below with reference to FIG. 7 for comparison with the procedure according to the present embodiment. FIG. 7 illustrates an example of a state in which two of the HDDs constituting RLU#01 fail (as the state 11), an example of a state in which rebuilding processing in the comparison procedure is performed (as the state 12), and an example of a state in which data-restoration processing in the comparison procedure is performed (as the state 13).

In the state 11 illustrated in FIG. 7, DISK#13 and DISK#14 constituting RLU#01 fail. In the comparison procedure of FIG. 7, when two of the HDDs in RLU#01 fail, rebuilding processing in both of RLU#00 and RLU#01 is performed for bringing RLU#00 and RLU#01 into a temporary state (i.e., the state 12 illustrated in FIG. 7). In the temporary state in the comparison procedure, RLU#00 is operated in accordance with RAID 5 by using DISK#00 to DISK#03, and RLU#01 is operated in accordance with RAID 5 by using DISK#04 and DISK#10 to DISK#12. Specifically, as indicated in the illustration of the state 12 in FIG. 7, DISK#04 is separated from RLU#00, and blocks of data and P parity are rearranged in DISK#00 to DISK#03, and RLU#00 is operated by using DISK#00 to DISK#03 in accordance with RAID 5. In addition, the failed DISK#13 and DISK#14 are separated from RLU#01, and DISK#04 separated from RLU#00 is incorporated into RLU#01, as indicated in the illustration of the state 12 in FIG. 7. In RLU#01, the blocks of the data (e.g., the data block D' 3) and the P parity (e.g., the P parity P' 0) which are lacking in RLU#01 before the rebuilding are rebuilt on the basis of the data stored in DISK#10 and DISK#12. Then, the rebuilt blocks of the data and the P parity are rearranged in DISK#04 and DISK#10 to DISK#12. When the data rearrangement is completed, RLU#01 is operated in accordance with RAID 5 as indicated in the illustration of the state 12 in FIG. 7.

Thereafter, when the failed HDDs as DISK#13 and DISK#14 are respectively replaced with new HDDs, data-restoration processing for each RLU#00 and RLU#01 is performed. Specifically, the data rearranged in DISK#04 and DISK#10 to RLU#12 for RLU#01 in the state 12 are temporarily read into the RAM 212, and are then rearranged in DISK#10 to DISK#14. In addition, the Q parity in RLU#01 is recalculated, and stored in the Q-parity storage areas in DISK#10 to DISK#14. After the data-restoration processing for RLU#01 as above is completed, RLU#01 is operated by using DISK#10 to DISK#14 in accordance with RAID 6 as indicated in the illustration of the state 13 in FIG. 7, which is identical to the state 1 illustrated in FIG. 5. Further, the data rearranged in DISK#00 to DISK#03 for RLU#00 in the state 12 are temporarily read into the RAM 212, and are then rearranged in DISK#00 to DISK#04. In addition, the Q parity in RLU#00 is recalculated, and stored in the Q-parity storage areas in DISK#00 to DISK#04. After the data-restoration processing for RLU#00 as above is completed, RLU#00 is operated by using DISK#00 to DISK#04 in accordance with RAID 6 as indicated in the illustration of the state 13 in FIG. 7, which is identical to the state 1 illustrated in FIG. 5.

The procedure according to the second embodiment which is performed when HDDs fail as explained with reference to FIGS. 5 and 6 is compared below with the comparison procedure as explained with reference to FIG. 7.

In the comparison procedure of FIG. 7, the data in all of DISK#00 to DISK#04 and DISK#10 to DISK#12 are rearranged in the process for the transition from the state 11 to the state 12. On the other hand, in the process of the transitions from the state 1 to the state 3 in the procedure of FIGS. 5 and 6 according to the second embodiment, only the Q-parity storage areas in RLU#00, among the storage areas in DISK#00 to DISK#04 and DISK#10 to DISK#12, are overwritten with data, and no data is written in the other storage areas.

Therefore, the frequency of the operations of writing data in DISK#00 to DISK#04 and DISK#10 to DISK#12 performed in the procedure of FIG. 5 until the temporary use of RLU#00 and RLU#01 in accordance with RAID 5 after the occurrence of the failure in DISK#13 and DISK#14 is distinctly lower than the frequency of the data writing operations performed in the comparison procedure of FIG. 7 until the temporary use of RLU#00 and RLU#01. That is, the processing burden imposed on the CPU 211 in the CM 201 until the temporary use of RLU#00 and RLU#01 in the procedure of FIG. 5 is lighter than the processing burden until the temporary use of RLU#00 and RLU#01 in the procedure of FIG. 7, so that the influence of the rebuilding processing in the procedure according to the present embodiment on the operations for accessing the HDDs in response to I/O requests from the host apparatus 400 is smaller than the influence of the rebuilding processing in the comparison procedure. Thus, the procedure according to the present embodiment may prevent serious lowering of the speed of the access processing in response to the I/O requests from the host apparatus.

Further, as illustrated in FIG. 5, RLU#00 in the state 3 is different from the state 1 only in that the Q-parity storage areas are logically separated from RLU#00. Therefore, the procedure for accessing RLU#00 in response to I/O requests from the host apparatus 400 needs not be greatly changed even after the transitions from the state 1 to the state 3 occur. For example, when the host apparatus 400 requests readout of data from RLU#00 while RLU#00 and RLU#01 are in either of the state 1 and the state 3, the access control unit 220 reads out the requested data from RLU#00 in an exactly identical manner. In addition, when the host apparatus 400 requests writing of data into RLU#00 while RLU#00 and RLU#01 are in either of the state 1 and the state 3, the access control unit 220 writes the requested data in RLU#00 in an exactly identical manner except that the access control unit 220 does not perform calculation and recording of the Q parity in RLU#00 in the state 3.

In the procedure of FIG. 7, the data in all of DISK#00 to DISK#04 and DISK#10 to DISK#12 are also rearranged in the process for the transition from the state 12 to the state 13. On the other hand, in the process for the transitions from the state 3 (illustrated in FIG. 5) to the state 6 (illustrated in FIG. 6), no data rearrangement is performed except that the data temporarily stored in the Q-parity storage areas in RLU#00 (in DISK#00 to DISK#04) are copied back in the replacement of DISK#14 after DISK#14 is replaced.

Therefore, the frequency of access to data in DISK#00 to DISK#04 and DISK#10 to DISK#12 in the procedure of FIGS. 5 and 6 until the resumption of the RAID-6 operation of RLU#00 and RLU#01 after the replacement of DISK#13 and DISK#14 is distinctly lower than the frequency of access to data in DISK#00 to DISK#04 and DISK#10 to DISK#12 in the comparison procedure of FIG. 7 until the resumption of the RAID-6 operation of RLU#00 and RLU#01 after the replacement of DISK#13 and DISK#14. That is, the processing burden imposed on the CPU 211 in the CM 201 until the resumption of the RAID-6 operation of RLU#00 and RLU#01 in the procedure of FIGS. 5 and 6 after the replacement of DISK#13 and DISK#14 is lighter than the processing burden until the resumption of the RAID-6 operation of RLU#00 and RLU#01 in the procedure of FIG. 7 after the replacement of DISK#13 and DISK#14, so that the influence of the processing for restoring the normal state in the procedure according to the present embodiment on the operations for accessing the HDDs in response to I/O requests from the host apparatus 400 is smaller than the influence of the processing for restoring the normal state in the comparison procedure.

Incidentally, in the case where RLU#00 is constituted by DISK#00 to DISK#03 and RLU#01 is constituted by DISK#04, DISK#10, and DISK#11 as indicated in the illustration of the state 12 in FIG. 7, RLU#00 may be temporarily operated in accordance with RAID 5 without the data rearrangement in RLU#00. However, in this case, calculation for data rebuilding is needed when the CM 201 receives from the host apparatus 400 a request for reading out some data from RLU#00 operated in accordance with RAID 5 as above, so that the speed of response to the request for reading out may be lowered. On the other hand, in the state 3 illustrated in FIG. 5, all the data blocks which may be requested to be read out by the host apparatus 400 (i.e., all the data blocks other than the Q-parity blocks) are stored in RLU#00 in the same positions as before the rebuilding processing. Therefore, in the state 3 illustrated in FIG. 5, it is unnecessary to perform data rebuilding when the CM 201 receives a request for reading out data, so that it is possible to prevent the lowering of the speed of response to the readout request.

In the procedure of FIGS. 5 and 6, the rebuilt data for RLU#01 are stored in the storage areas for parity data in an RLU (i.e., RLU#00) other than the RLU (i.e., RLU#01) in which DISK#13 and DISK#14 fail, and the other RLU (i.e., RLU#00) has been operated in accordance with RAID 6 until the failure. However, the rebuilt data for RLU#01 may be stored in storage areas for parity data in another RLU which has been operated in accordance with, for example, RAID 4 or RAID 5 until the failure. In this case, the use of the RLU in which the rebuilt data for RLU#01 are stored in the storage areas for parity data is resumed in accordance with RAID 1.

2.5 RAID Management Table

Figure 8:
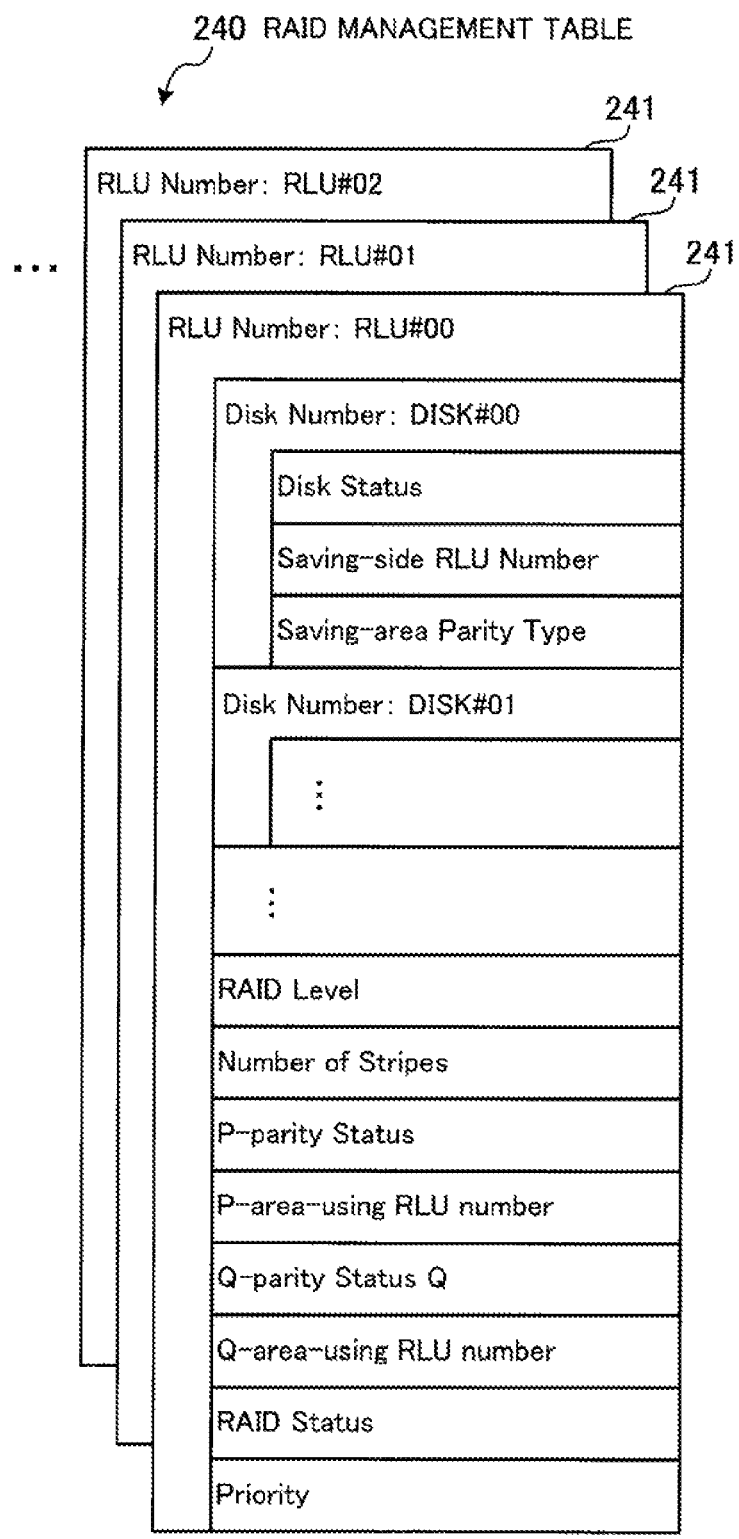
FIG. 8 illustrates examples of information items in a RAID management table.

FIG. 8 illustrates examples of information items in the RAID management table 240. A record 241 is recorded for each RLU in the RAID management table 240. In each record 241, an RLU number for identifying the corresponding RLU is record. In addition, the information items of "Disk Number", "RAID Level", "Number of Stripes", "P-parity Status", "P-area-using RLU Number", "Q-parity Status", "Q-area-using RLU Number", "RAID Status", and "Priority" are recorded in each record 241.

The information item "Disk Number" indicates a disk number as an identification number of each of multiple HDDs to which physical storage areas constituting the RLU corresponding to the record 241 belong. Since each RLU is constituted by the physical storage areas in the multiple HDDs, the disk numbers are recorded respectively for the multiple HDDs. Further, the information items of "Disk Status", "Saving-side RLU Number", and "Saving-area Parity Type" are recorded for each of the multiple HDDs (which is identified by one of the disk numbers).

The information item "Disk Status" indicates the operational status of the corresponding HDD, and one of the states "Normal", "Failed", "Rebuilding", "Saved", and "Copying Back" is recorded as the information item "Disk Status". The operational status "Normal" indicates that the corresponding HDD is normally operating, "Failed" indicates that the corresponding HDD is failed, "Rebuilding" indicates that rebuilding processing of data which have been stored in storage areas in the failed HDD constituting an RLU before the failure is currently being performed, "Saved" indicates that the rebuilding processing is completed and all the data which have been stored in the storage areas in the failed HDD before the failure are temporarily stored in parity storage areas in another RLU, and "Copying Back" indicates that the processing for writing back the rebuilt data to replacements of the failed HDDs is currently being performed.

The information items "Saving-side RLU Number" and "Saving-area Parity Type" are recorded only when the operational status "Rebuilding" or "Saved" is set as the information item "Disk Status" in the record 241. The information item "Saving-side RLU Number" indicates an RLU which is other than the RLU corresponding to the record 241 and serves a storage area as a refuge for storing rebuilt data for the HDD corresponding to each disk number and constituting the RLU corresponding to the record 241 when the HDD fails. The information item "Saving-area Parity Type" indicates whether the storage area served as the refuge by the other RLU is originally used for the P parity or the Q parity in the other RLU.

The information item "RAID Level" indicates the RAID level, in normal operation, of the RLU corresponding to each record 241. The information item "Number of Stripes" indicates the maximum number of stripes which may be stored in each HDD constituting the RLU corresponding to the record 241.

The information item "P-parity Status" indicates the state of use of the P-parity storage areas in the RLU corresponding to the record 241, and is set in the case where one of "RAID 4", "RAID 5", and "RAID 6" is set as the information item "RAID Level". Specifically, "Normal" or "Storing Saved Data" is set as the information item "P-parity Status", where the state "Normal" indicates that P-parity data based on the data in the RLU corresponding to the record 241 are stored in the P-parity storage areas, and "Storing Saved Data" indicates that rebuilt data for an RLU other than the RLU corresponding to the record 241 are temporarily stored in the P-parity storage areas. The information item "P-area-using RLU Number" indicates an RLU, other than the RLU corresponding to the record 241, which uses as refuges the P-parity storage areas in the RLU corresponding to each record 241 (i.e., the RLU for which the rebuilt data are temporarily stored in the P-parity storage areas in the RLU corresponding to each record 241). The information item "P-area-using RLU Number" is set when "Storing Saved Data" is indicated as the information item "P-parity Status".

The information item "Q-parity Status" indicates the state of use of the Q-parity storage areas in the RLU corresponding to the record 241, and is set in the case where "RAID 6" is set as the information item "RAID Level". Specifically, the indicated state of use of the Q-parity storage areas is "Normal" or "Storing Saved Data", where the state "Normal" indicates that Q-parity data based on the data in the RLU corresponding to the record 241 are stored in the Q-parity storage areas, and "Storing Saved Data" indicates that rebuilt data for an RLU other than the RLU corresponding to the record 241 are temporarily stored in the Q-parity storage areas. The information item "Q-area-using RLU Number" indicates an RLU, other than the RLU corresponding to the record 241, which uses as refuges the Q-parity storage areas in the RLU corresponding to each record 241 (i.e., the RLU for which the rebuilt data are temporarily stored in the Q-parity storage areas in the RLU corresponding to each record 241). The information item "Q-area-using RLU Number" is set when "Storing Saved Data" is indicated as the information item "Q-parity Status".

The information item "RAID Status" indicates the state of the RLU corresponding to the record 241. Specifically, one of the states "Double-parity Usable", "Single-parity Usable", "Nonredundant", "Rebuilding for Other RLU", "Copying Back to Other RLU", "Rebuilding Using Other RLU", "Saved in Other RLU", "Copying Back from Other RLU", and "Access Prohibited" is set as the information item "RAID Status". The state "Double-parity Usable" may be set as the information item "RAID Status" only when "RAID 6" is set as the information item "RAID Level". In the state "Double-parity Usable", the P-parity storage areas and the Q-parity storage areas are in normal states (i.e., none of the P-parity storage areas and the Q-parity storage areas are used as refuges for rebuilt data for an RLU other than the RLU corresponding to the record 241). The state "Single-parity Usable" may be set as the information item "RAID Status" only when "RAID 4", "RAID 5", or "RAID 6" is set as the information item "RAID Level". In the state "Single-parity Usable", only the P-parity storage areas or only the Q-parity storage areas, among the all the parity storage areas, are in normal states. In the state "Nonredundant", the data in the RLU corresponding to the record 241 have no redundancy.

In the state "Rebuilding for Other RLU", the processing for storing in the P-parity storage areas or the Q-parity storage areas rebuilt data for an RLU other than the RLU corresponding to the record 241 is being performed. In the state "Copying Back to Other RLU", the processing for writing back to an RLU other than the RLU corresponding to the record 241 rebuilt data stored in the P-parity storage areas or the Q-parity storage areas for the RLU other than the RLU corresponding to the record 241 is being performed. In the state "Rebuilding Using Other RLU", rebuilding processing using as refuges data parity storage areas in an RLU other than the RLU corresponding to the record 241 is being performed. In the state "Saved in Other RLU", the rebuilding processing is completed and the rebuilt data for the RLU corresponding to the record 241 are stored in parity storage areas in an RLU other than the RLU corresponding to the record 241. In the state "Copying Back from Other RLU", processing for writing back the rebuilt data stored in the parity storage areas in the RLU other than the RLU corresponding to the record 241 to one or more HDDs which have replaced one or more failed HDDs is being performed. In the state "Access Prohibited", access from the host apparatus 400 to the RLU corresponding to the record 241 is prohibited (i.e., the use of the RLU is prohibited).

The information item "Priority" indicates the priority which is assigned to the RLU corresponding to the record 241.

2.6 Flow of Operations

Example of flows of operations performed by the storage system according to the second embodiment are explained below.

Figure 9:
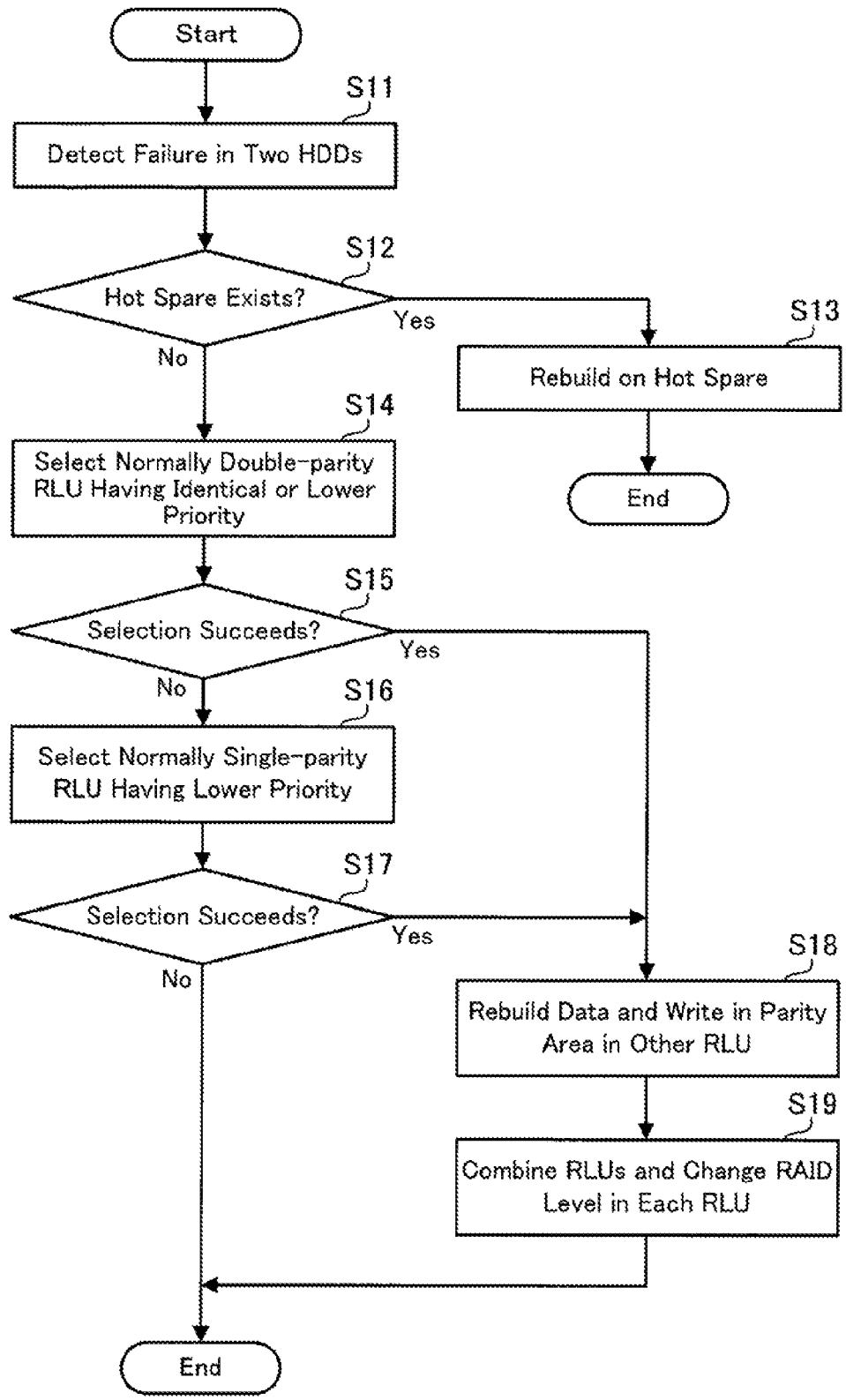
FIG. 9 indicates an example of a flow of operations which are performed when two of HDDs belonging to an RLU fail.

FIG. 9 indicates an example of a flow of operations which are performed when two of HDDs belonging to an RLU fail. In the following explanations, it is assumed that DISK#13 and DISK#14 belonging to RLU#01 fail.

<Step S11> When the access control unit 220 detects failures in the two of the HDDs (DISK#13 and DISK#14) belonging to RLU#01, the access control unit 220 informs the restoration control unit 230 of the disk numbers of the failed HDDs and the RLU number of the RLU (to which the failed HDDs belong). The restoration control unit 230 updates the information item "Disk Status" associated with each of DISK#13 and DISK#14 in the record 241 for RLU#01 in the RAID management table 240 from "Normal" to "Failed". In addition, the restoration control unit 230 updates the information item "RAID Status" in the record 241 for RLU#01 from "Double-parity Usable" to "Nonredundant".

<Step S12> The restoration control unit 230 determines whether or not a usable hot-spare disk exists in the DE 300. In the case where a usable hot-spare disk exists in the DE 300, i.e., when yes is determined in step S12, the restoration control unit 230 performs the operations in step S13. In the case where no usable hot-spare disk exists in the DE 300, i.e., when no is determined in step S12, the restoration control unit 230 performs the operations in step S14.

<Step S13> The restoration control unit 230 controls the access control unit 220 so that the access control unit 220 rebuilds the data which have been stored in the failed DISK#13 in RLU#01 before the failure, and writes the rebuilt data in the usable hot-spare disk. When the access control unit 220 completes the storing of the rebuilt data, the restoration control unit 230 logically separates DISK#13 and DISK#14 from RLU#01, and incorporates the hot-spare disk into RLU#01. Thereafter, the restoration control unit 230 makes the access control unit 220 resume the use of RLU#01 in accordance with RAID 5.

<Step S14> The restoration control unit 230 searches the RAID management table 240 for an RLU as a refuge for rebuilt data by reference to one or more records 241 for one or more RLUs other than RLU#01 (in which the two HDDs fail) in the RAID management table 240. Specifically, the restoration control unit 230 searches for an RLU which is in normal RAID-6 operation (i.e., in which the P-parity storage areas and Q-parity storage areas are in normal states) and to which a priority identical to or lower than the priority of RLU#01 is assigned. Further specifically, the restoration control unit 230 makes an attempt to extract from the RAID management table 240 one or more records 241 satisfying the condition that the value of the information item "Number of Stripes" is equal to or greater than the number of stripes in RLU#01, and "RAID 6" is set as the information item "RAID Level", and "Double-parity Usable" is set as the information item "RAID Status", and the value of the information item "Priority" is equal to or lower than the priority assigned to RLU#01. Then, the restoration control unit 230 determines one of the one or more extracted records 241 having the lowest priority to be the refuge for rebuilt data.

<Step S15> It is determined whether or not an RLU satisfying the above condition is determined in step S14. When an RLU satisfying the above conditions is determined in step S14, i.e., when yes is determined in step S15, the restoration control unit 230 performs the operations in step S18. On the other hand, when no RLU satisfying the above conditions is found in step S14, i.e., when no is determined in step S15, the restoration control unit 230 performs the operations in step S16.

<Step S16> The restoration control unit 230 searches for an RLU which is in normal RAID-4 or RAID-5 operation (i.e., in which the P-parity storage areas are in normal states) and to which a priority lower than the priority of RLU#01 is assigned. Specifically, the restoration control unit 230 makes an attempt to extract from the RAID management table 240 one or more records 241 satisfying the conditions that the value of the information item "Number of Stripes" is equal to or greater than the number of stripes in RLU#01, and "RAID 4" or "RAID 5" is set as the information item "RAID Level", and "Single-parity Usable" is set as the information item "RAID Status", and the value of the information item "Priority" is lower than the priority assigned to RLU#01. Then, the restoration control unit 230 determines one of the one or more extracted records 241 having the lowest priority to be the refuge for rebuilt data.

<Step S17> It is determined whether or not an RLU satisfying the above condition is determined in step S16. When an RLU satisfying the above conditions is determined in step S16, i.e., when yes is determined in step S17, the restoration control unit 230 performs the operations in step S18. On the other hand, when no RLU satisfying the above conditions is found in step S16, i.e., when no is determined in step S17, the restoration control unit 230 relinquishes the rebuilding processing for RLU#01. In this case, the data in RLU#01 is used and accessed in response to requests from the host apparatus 400 without data redundancy.

In the following explanations on steps S18 and S19, it is assumed that RLU#00 is determined to be the refuge for the rebuilt data in step S14 or S16.

<Step S18> The restoration control unit 230 updates the information item "RAID Status" in the record 241 for RLU#01 from "Nonredundant" to "Rebuilding Using Other RLU". In addition, the restoration control unit 230 updates the information item "Disk Status" in the field for DISK#13 in the same record 241 to "Rebuilding", and records the RLU number of RLU#00 in the field of the "Saving-side RLU Number" and "Q Parity" in the field of the "Saving-area Parity Type".

Further, in the case where RLU#00 has been used in accordance with RAID 6 and is determined to be the refuge for the rebuilt data, i.e., when yes is determined in step S15, the restoration control unit 230 performs the following processing for setting the RAID management table 240 (table-setting processing). The restoration control unit 230 updates, in the record 241 for RLU#00, the information item "RAID Status" from "Double-parity Usable" to "Rebuilding for Other RLU" and the information item "Q-parity Status" from "Normal" to "Storing Saved Data". In addition, the restoration control unit 230 sets the RLU number of RLU#01 as the information item "Q-area-using RLU Number" in the record 241 for RLU#00.

On the other hand, in the case where RLU#00 has been used in accordance with RAID 4 or RAID 5 and is determined to be the refuge for the rebuilt data, i.e., when yes is determined in step S17, the restoration control unit 230 performs the following processing for setting the RAID management table 240 (table-setting processing). The restoration control unit 230 updates, in the record 241 for RLU#00, the information item "RAID Status" from "Single-parity Usable" to "Rebuilding for Other RLU" and the information item "P-parity Status" from "Normal" to "Storing Saved Data". In addition, the restoration control unit 230 sets the RLU number of RLU#01 as the information item "P-area-using RLU Number" in the record 241 for RLU#00.

When the table-setting processing is completed, the restoration control unit 230 requests the access control unit 220 to rebuild the data which have been stored in the failed DISK#13 in RLU#01 and write the rebuilt data in the parity storage areas in RLU#00. In the case where RLU#00 has been used in accordance with RAID 6 and is determined to be the refuge for the rebuilt data, i.e., when yes is determined in step S15, the rebuilt data are written in the Q-parity storage areas in RLU#00. On the other hand, in the case where RLU#00 has been used in accordance with RAID 4 or RAID 5 and is determined to be the refuge for the rebuilt data, i.e., when yes is determined in step S17, the rebuilt data are written in the P-parity storage areas in RLU#00.

<Step S19> When the access control unit 220 completes the writing of the rebuilt data, the restoration control unit 230 combines RLU#00 and RLU#01 and changes the RAID levels of RLU#00 and RLU#01 by performing the following table-setting processing.

The restoration control unit 230 updates the information item "RAID Status" in the record 241 for RLU#01 to "Saved in Other RLU", and the information item "Disk Status" associated with DISK#13 in the same record 241 to "Saved".

In addition, in the case where RLU#00 has been used in accordance with RAID 6 and is determined to be the refuge for the rebuilt data, i.e., when yes is determined in step S15, the restoration control unit 230 updates the information item "RAID Status" in the record 241 for RLU#00 to "Single-parity Usable". On the other hand, in the case where RLU#00 has been used in accordance with RAID 4 or RAID 5 and is determined to be the refuge for the rebuilt data, i.e., when yes is determined in step S17, the restoration control unit 230 updates the information item "RAID Status" in the record 241 for RLU#00 to "Nonredundant".

When the above table-setting processing is completed, one type of parity storage areas in RLU#00 are logically separated from RLU#00, and the logically separated parity storage areas are logically incorporated into RLU#01. Therefore, RLU#00 and RLU#01 are combined, and the RAID level of each RLU is substantially changed.

In the case where "RAID 6" is set in the information item "RAID Level" in the record 241 for RLU#01, and the information item "RAID Status" is updated to "Saved in Other RLU", the access control unit 220 controls RLU#00 in accordance with RAID 5. In addition, in the case where "RAID 6" is set in the information item "RAID Level" in the record 241 for RLU#00, and the information item "RAID Status" in the record 241 for RLU#00 is updated to "Single-parity Usable", the access control unit 220 controls RLU#00 in accordance with RAID 5. On the other hand, in the case where "RAID 4" or "RAID 5" is set in the information item "RAID Level" in the record 241 for RLU#00, and the information item "RAID Status" in the record 241 for RLU#00 is updated to "Nonredundant", the access control unit 220 controls RLU#00 in accordance with RAID 1.

In the processing of FIG. 9, in step S14, an RLU to which a priority equal to or lower than the priority of RLU#01 is assigned is determined to be the refuge for the rebuilt data for RLU#01. Therefore, it is possible to prevent lowering of the data redundancy in one or more other RLUs (if any) to which a priority higher than the priority of RLU#01 is assigned. In addition, in step S16, an RLU to which a priority lower than the priority of RLU#01 is assigned is determined to be the refuge for the rebuilt data for RLU#01. Therefore, it is possible to prevent loss of the data redundancy in one or more other RLUs (if any) to which a priority equal to or higher than the priority of RLU#01 is assigned. Thus, the operations in steps S14 and S16 are performed in such a manner that the data in relatively important RLUs are safer.

Figure 10:
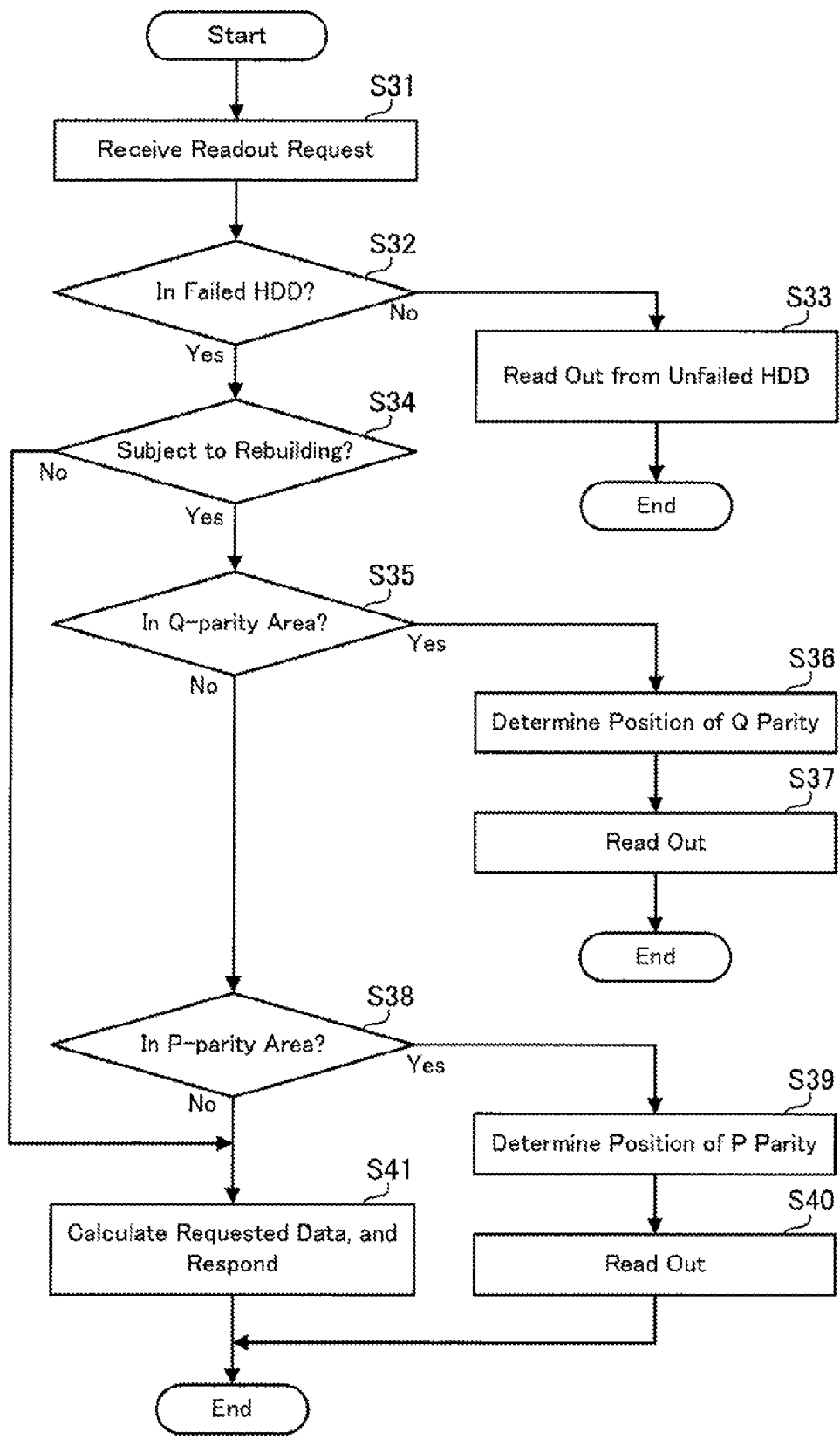
FIG. 10 indicates an example of a flow of operations which are performed when an I/O request is issued to a storage system in which the RLUs are combined.

FIG. 10 indicates an example of a flow of operations which are performed when an I/O request is issued to the storage system in which the RLUs are combined. Specifically, FIG. 10 indicates a flow of operations performed when the host apparatus 400 requests data readout from RLU#01 combined with RLU#00. The operations indicated in FIG. 10 are performed for each data block.

<Step S31> The access control unit 220 receives from the host apparatus 400 a request for readout of a data block from RLU#01.

<Step S32> The access control unit 220 determines whether or not the data block requested to be read out is recorded in a failed HDD (DISK#13 or DISK#14) among the HDDs (DISK#10 to DISK#14) which have belonged to RLU#01 in the initial state. In the case where the data block requested to be read out is recorded in a failed HDD, i.e., when yes is determined in step S32, the access control unit 220 performs the operations in step S34. On the other hand, in the case where the data block requested to be read out is recorded in an unfailed HDD (one of the unfailed HDDs DISK#10 to DISK#12), i.e., when no is determined in step S32, the access control unit 220 performs the operations in step S33.

<Step S33> The access control unit 220 reads out the requested data block from the unfailed HDD, and returns a response containing the requested data to the host apparatus 400.

<Step S34> The access control unit 220 determines whether or not the requested data block is subject to the rebuilding processing. Specifically, in the case where "Rebuilding" or "Saved" is set in the record 241 for RLU#01 as the information item "Disk Status" for the HDD in which the requested data block has been recorded, the access control unit 220 determines that the data block is subject to the rebuilding processing, i.e., the access control unit 220 determines yes in step S34, so that the access control unit 220 performs the operations in step S35. Since the data block is subject to the rebuilding processing, in this case, the requested data block has been recorded in DISK#13. On the other hand, in the case where "Failed" is set in the record 241 for RLU#01 as the information item "Disk Status" for the HDD in which the requested data block has been recorded, the access control unit 220 determines that the data block is not subject to the rebuilding processing, i.e., the access control unit 220 determines no in step S34, so that the access control unit 220 performs the operations in step S41. Since the data block is not subject to the rebuilding processing, in this case, the requested data block has been recorded in DISK#14.

<Step S35> The access control unit 220 determines the disk number of the HDD for which "Saved" is set as the information item "Disk Status", by reference to the record 241 for RLU#01. In the following explanations, at first, it is assumed that "Saved" is set as the information item "Disk Status" for DISK#13.

The access control unit 220 determines whether or not the rebuilt data are stored in Q-parity storage areas in RLU#00, by reference to the information item "Saving-area Parity Type" for DISK#13. In the case where the rebuilt data are stored in Q-parity storage areas, i.e., when yes is determined in step S35, the access control unit 220 performs the operations in step S36. On the other hand, in the case where the rebuilt data are not stored in Q-parity storage areas, i.e., when no is determined in step S35, the access control unit 220 performs the operations in step S38.

<Step S36> The access control unit 220 reads out from the record 241 for RLU#01 the RLU number which is set as the information item "Saving-side RLU Number" associated with DISK#13. In this explanation, it is assumed that the RLU number of RLU#00 is set as the information item "Saving-side RLU Number" in the record 241 for RLU#01.

The access control unit 220 determines the position of the data block requested to be read out, in the physical storage areas of RLU#01. In this operation, the access control unit 220 determines the HDD in which the Q-parity data has been stored in the stripe having the stripe number Ns, where Ns is the stripe number of the stripe in which the requested data block has been stored in RLU#01, and is a non-negative integer, and the initial value of Ns is zero. In the following explanation, the HDD in which the Q-parity data has been stored in RLU#00 is indicated by the disk number Nq, which is a non-negative integer and the initial value of which is zero. In the case where the HDDs belonging to RLU#00 are recorded in the record 241 for RLU#00 in the order of DISK#00, DISK#01, DISK#02, DISK#03, and DISK#04, DISK#00, DISK#01, DISK#02, DISK#03, and DISK#04 have the disk numbers Nq=0, 1, 2, 3, and 4, respectively.

The access control unit 220 recognizes the number of the HDDs belonging to RLU#00 by reference to the record 241 for RLU#00. In the case where the number of HDDs belonging to RLU#00 is Nd, the access control unit 220 calculates the disk number Nq of the HDD in which the Q-parity data has been stored in RLU#00 by using the following formula.

$$Nq=(Nd-1)-\{\text{the remainder of } (Ns/Nd)\}$$

<Step S37> The access control unit 220 reads out a data block from the position determined in step 536, and returns a response containing the requested data to the host apparatus 400.

<Step S38> The access control unit 220 determines whether or not the rebuilt data are stored in the P-parity storage areas in RLU#00, by reference to the information item "Saving-area Parity Type" for DISK#13 in the record 241 for RLU#01. In the case where the rebuilt data are stored in the P-parity storage areas in RLU#01, i.e., when yes is determined in step S38, the access control unit 220 performs the operations in step S39.

On the other hand, in the case where "Rebuilding" is set as the information item "Disk Status" for an HDD (DISK#13 in this example) in the record 241 for RLU#01, no is determined in each of steps S35 and S38. In this case, the rebuilding processing of the data which have been stored in DISK#13 has not yet been completed and the requested data may be stored in neither of the P-parity storage area and Q-parity storage area in the RLU used for saving the rebuilt data (i.e., RLU#00). Therefore, the access control unit 220 performs the operations in step S41.

<Step S39> The access control unit 220 reads out the RLU number which is set as the information item "Saving-side RLU Number" associated with DISK#13 in the record 241 for RLU#01. In this explanation, it is assumed that the RLU number of RLU#00 is set as the information item "Saving-side RLU Number" associated with DISK#13 in the record 241 for RLU#01.

The access control unit 220 determines the position of the requested data block in the physical storage areas in RLU#00. In this operation, the HDD in which the P-parity data has been stored in RLU#00 in the stripe having the stripe number Ns is determined. As mentioned before, Ns is the stripe number of the stripe in which the requested data block has been stored in RLU#01, and is a non-negative integer, and the initial value of Ns is zero. In the following explanation, the HDD in which the P-parity data has been stored in RLU#00 is indicated by the disk number Np, which is a non-negative integer and the initial value of which is zero. In the case where the HDDs belonging to RLU#00 are recorded in the record 241 for RLU#00, in the order of DISK#00, DISK#01, DISK#02, DISK#03, and DISK#04, DISK#00, DISK#01, DISK#02, DISK#03, and DISK#04 have the disk numbers Np=0, 1, 2, 3, and 4, respectively.

The access control unit 220 recognizes the number Nd of the HDDs belonging to RLU#00 by reference to the record 241 for RLU#00, and calculates the disk number Np of the HDD in which the P-parity data has been stored in RLU#00 by using the following formula.

$$Np=\text{the remainder of } [Nd+Nd-2-\{\text{the remainder of } (Ns/Nd)\}]/Nd$$

<Step S40> The access control unit 220 reads out data block from the position determined in step S39, and returns a response containing the requested data to the host apparatus 400.

<Step S41> The access control unit 220 determines the HDDs for which "Normal" is set as the information item "Disk Status" in the record 241 for RLU#01. In this example, DISK#10, DISK#11, and DISK#12 are determined. Then, the access control unit 220 calculates the values of the requested data block on the basis of the data in the DISK#10, DISK#11, and DISK#12 in the stripe having the stripe number Ns. At this time, the data in DISK#10, DISK#11, and DISK#12 in the stripe having the stripe number Ns may include three data blocks, or one or more data blocks and one or both of the P parity and the Q parity. Thereafter, the access control unit 220 returns to the host apparatus 400 a response containing the requested data which is calculated as above.

Figure 11:
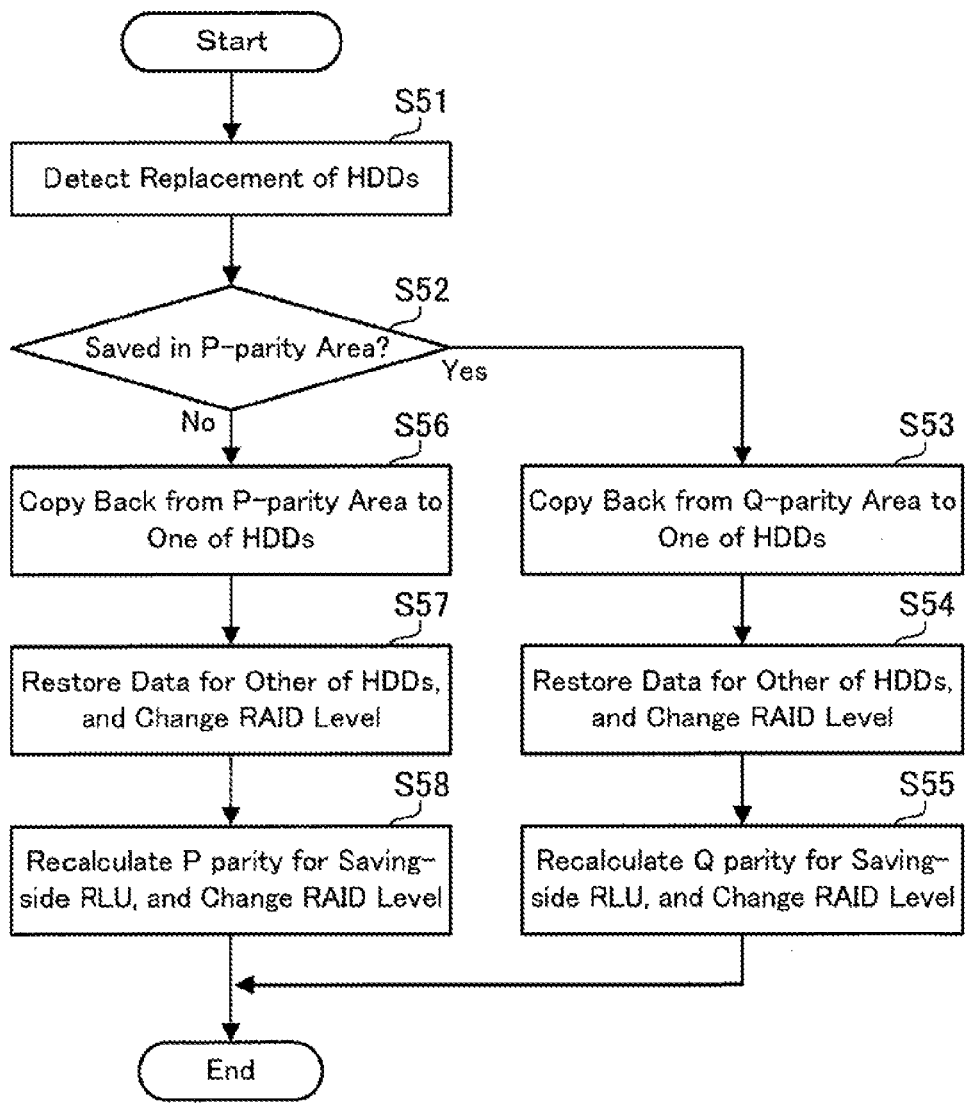
FIG. 11 indicates an example of a flow of operations performed after the failed HDDs are replaced.

FIG. 11 indicates an example of a flow of operations performed after the failed HDDs are replaced. In the following explanations, it is assumed that DISK#13 and DISK#14 belonging to RLU#01 are replaced.

<Step S51> For example, when the access control unit 220 detects restoration of communication with DISK#13 and DISK#14, the access control unit 220 informs the restoration control unit 230 of the restoration of communication. When the restoration control unit 230 is informed of the restoration of communication, the restoration control unit 230 determines that DISK#13 and DISK#14 have been replaced, and performs the operations in step S52.

<Step S52> The restoration control unit 230 determines an RLU (RLU#01 in this example) to which the replaced DISK#13 and DISK#14 belong, and refers to the record 241 for the determined RLU in the RAID management table 240. Then, the restoration control unit 230 extracts from the record 241 for RLU#01 an HDD for which the information item "Saving-side RLU Number" is set in the record 241 for RLU#01, and reads out the information item "Saving-area Parity Type" associated with the extracted HDD. In the case where "Q Parity" is set as the information item "Saving-area Parity Type", i.e., when yes is determined in step S52, the restoration control unit 230 performs the operations in step S53. On the other hand, in the case where "P Parity" is set as the information item "Saving-area Parity Type", i.e., when no is determined in step S52, the restoration control unit 230 performs the operations in step S56.

<Step S53> The restoration control unit 230 updates the information item "Disk Status" associated with the HDD for which "Q Parity" is set as the "Saving-side RLU Number" in the record 241 for RLU#01 to "Copying Back". In this example, the HDD for which "Q Parity" is set as the "Saving-side RLU Number" in the record 241 for RLU#01 is assumed to be DISK#13. In addition, the restoration control unit 230 updates the information item "RAID Status" in the record 241 for RLU#01 to "Copying Back from Other RLU". Further, the restoration control unit 230 refers to the record 241 for the RLU indicated by the information item "Saving-side RLU Number" (RLU#00 in this example), and updates the information item "RAID Status" in the record 241 for the RLU (RLU#00 in this example) to "Copying Back to Other RLU".

When the above operations for setting the RAID management table 240 are completed, the restoration control unit 230 requests the access control unit 220 to start processing for copying data from RLU#00 back to RLU#01. Since "Storing Saved Data" is set as the information item "Q-parity Status" in the record 241 for RLU#00, the access control unit 220 recognizes that the data to be copied back are to be read out from the Q-parity storage areas in RLU#00. In addition, since "Q Parity" is set as the information item "Saving-area Parity Type" associated with DISK#13 in the record 241 for RLU#01, the access control unit 220 recognizes that the data read out from the Q-parity storage areas in RLU#00 are to be copied back to DISK#13. Therefore, the access control unit 220 reads out the data from the Q-parity storage areas in RLU#00, and writes the data back to (the replacement of) DISK#13.

When the access control unit 220 completes the copy-back processing, the restoration control unit 230 updates, in the record 241 for RLU#01, the information item "Disk Status" associated with DISK#13 to "Normal", and deletes the information which is set as the information items "Saving-side RLU Number" and "Saving-area Parity Type" associated with DISK#13.

<Step S54> The restoration control unit 230 requests the access control unit 220 to restore the data in DISK#14 in RLU#01. The access control unit 220 recognizes, on the basis of each information item "Disk Status" in the record 241 for RLU#01, that normal data are stored in DISK#10 to DISK#13. The access control unit 220 recalculates the data which have been stored in DISK#14 before the failure, on the basis of the data stored in DISK#10 to DISK#13 in RLU#01, and writes the recalculated data in DISK#14.

When the access control unit 220 completes the above processing for data restoration, the restoration control unit 230 updates the information item "Disk Status" associated with DISK#14 in the record 241 for RLU#01 to "Normal". In addition, the restoration control unit 230 updates the information item "RAID Status" in the record 241 for RLU#01 to "Double-parity Usable". The above operations of setting the RAID management table 240 enable use of RLU#01 in accordance with RAID 6 as before the failures in DISK#13 and DISK#14.

<Step S55> The restoration control unit 230 requests the access control unit 220 to recalculate the Q parity in RLU#00. Then, the access control unit 220 recalculates the Q parity on the basis of data blocks stored in DISK#00 to DISK#04, and overwrites the Q-parity storage areas in RLU#00 with the recalculated Q parity.

When the overwriting of all the Q-parity storage areas in RLU#00 is completed, the restoration control unit 230 updates the information item "Q-parity Status" in the record 241 for RLU#00 to "Normal", and deletes the RLU number of RLU#01 in the information item "Saving-side RLU Number" in the record 241 for RLU#00. In addition, in the case where "RAID 6" is set as the information item "RAID Level" in the record 241 for RLU#00, the restoration control unit 230 updates the information item "RAID Status" in the record 241 for RLU#00 to "Double-parity Usable". On the other hand, in the case where "RAID 4" or "RAID 5" is set as the information item "RAID Level" in the record 241 for RLU#00, the restoration control unit 230 updates the information item "RAID Status" in the record 241 for RLU#00 to "Single-parity Usable". The above operations for setting the RAID management table 240 enable use of RLU#00 at the same RAID level as before the failures in DISK#13 and DISK#14.

<Step S56> The restoration control unit 230 updates the information item "Disk Status" associated with the HDD for which "P Parity" is set as the information item "Saving-area Parity Type" in the record 241 for RLU#01 to "Copying Back". In this example, the HDD for which "P Parity" is set as the information item "Saving-area Parity Type" in the record 241 for RLU#01 is assumed to be DISK#13. In addition, the restoration control unit 230 updates the information item "RAID Status" in the record 241 for RLU#01 to "Copying Back from Other RLU". Further, the restoration control unit 230 refers to the record 241 for the RLU of which the RLU number is set as information item "Saving-side RLU Number" (RLU#00 in this example), and updates the information item "RAID Status" in the same record 241 (for RLU#00) to "Copying Back to Other RLU".

When the above operations of setting the RAID management table 240 are completed, the restoration control unit 230 requests the access control unit 220 to start an operation for copying data from RLU#00 back to RLU#01. Since "Storing Saved Data" is set as the information item "P-parity Status" in the record 241 for RLU#00, the access control unit 220 recognizes that the data to be copied back are to be read out from the P-parity storage areas in RLU#00. In addition, since "P Parity" is set as the information item "Saving-area Parity Type" associated with DISK#13 in the record 241 for RLU#01, the access control unit 220 recognizes that the data read out from the P-parity storage areas in RLU#00 are to be copied back to DISK#13. Therefore, the access control unit 220 reads out the data from the P-parity storage areas in RLU#00, and writes the data back to DISK#13.

When the access control unit 220 completes the copy-back processing, the restoration control unit 230 updates, in the record 241 for RLU#01, the information item "Disk Status" associated with DISK#13 to "Normal", and deletes the information which is set as the information items "Saving-side RLU Number" and "Saving-area Parity Type" associated with DISK#13.

<Step S57> The data in DISK#14 after the replacement is restored in a manner similar to step S54. When the processing for data restoration is completed, the restoration control unit 230 updates the information item "Disk Status" associated with DISK#14 in the record 241 for RLU#01 to "Normal". In addition, the restoration control unit 230 updates the information item "RAID Status" in the record 241 for RLU#01 to "Double-parity Usable". The above operations of setting the RAID management table 240 enable use of RLU#01 in accordance with RAID 6 as before the failures in DISK#13 and DISK#14.

<Step S58> The restoration control unit 230 requests the access control unit 220 to recalculate the P parity in RLU#00. Then, the access control unit 220 recalculates the P parity on the basis of data blocks stored in DISK#00 to DISK#04, and overwrites the P-parity storage areas in RLU#00 with the recalculated P parity.

When the overwriting of all the P-parity storage areas in RLU#00 is completed, the restoration control unit 230 updates the information item "P-parity Status" in the record 241 for RLU#00 to "Normal", and deletes the RLU number of RLU#01 in the information item "P-area-using RLU Number" in the record 241 for RLU#00. In addition, in the case where "RAID 6" is set as the information item "RAID Level" in the record 241 for RLU#00, the restoration control unit 230 updates the information item "RAID Status" in the record 241 for RLU#00 to "Double-parity Usable". On the other hand, in the case where "RAID 4" or "RAID 5" is set as the information item "RAID Level" in the record 241 for RLU#00, the restoration control unit 230 updates the information item "RAID Status" in the record 241 for RLU#00 to "Single-parity Usable". The above operations for setting the RAID management table 240 enable use of RLU#00 at the same RAID level as before the failures in DISK#13 and DISK#14.

The operations performed in the case where two HDDs in RLU#01 which is normally used in accordance with RAID 6 fail are explained above with reference to FIGS. 9 to 11. Further, in the case where one HDD in RLU#01 which is normally used in accordance with RAID 6 fail, it is also possible to store data which have been stored in the failed HDD in parity storage areas in RLU#00. In this case, even while the rebuilt data are saved in the parity storage areas in RLU#00, RLU#01 may be used with triple data redundancy.

3. Third Embodiment

The third embodiment is explained below. The third embodiment is different from the second embodiment in the sequence of operations performed by the CMs (Controller Modules). Therefore, in the following explanations, the same reference numbers as the second embodiment are used.

3.1 Operations on RLUs

Example of flows of operations performed by the storage system according to the third embodiment are explained below.

According to the third embodiment, when two of HDDs belonging to an RLU which has been used in accordance with RAID 6 (e.g., RLU#01) fail, rebuilt data for the two failed HDDs are temporarily stored in the P-parity storage areas and the Q-parity storage areas in another RLU which has also been used in accordance with RAID 6 (e.g., RLU#00). Therefore, according to the third embodiment, it is possible to prevent lowering of the data redundancy in the RLU in which the two HDDs fail.

Figure 12:
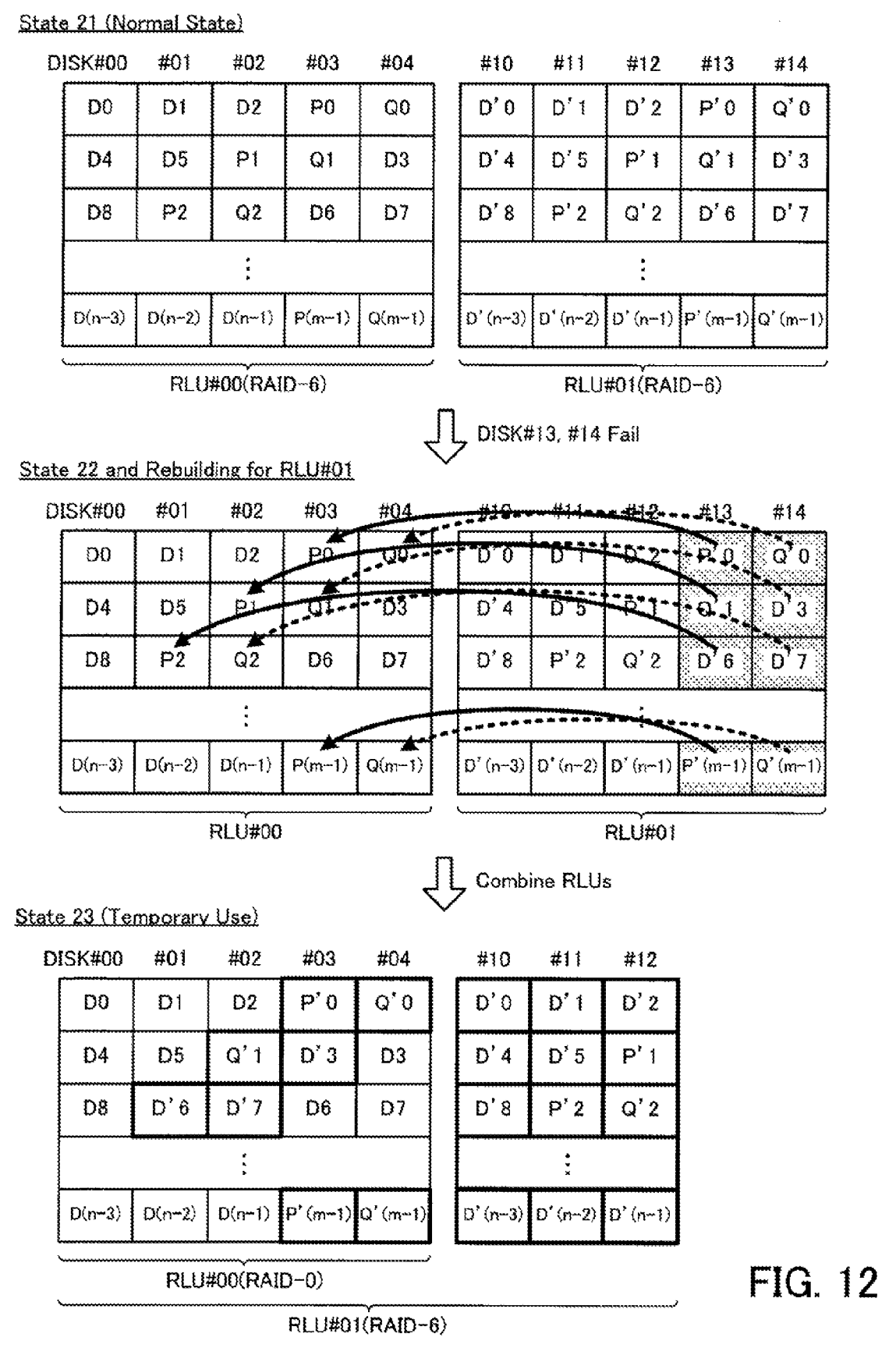

FIGS. 12 and 13 illustrate examples of states of the RLUs and operations on the RLUs in a procedure performed according to the third embodiment when hard disk drives (HDDs) fail. Specifically, FIG. 12 illustrates an example of a state in which both of RLU#00 and RLU#01 normally operate (as the state 21), an example of a state in which two of the HDDs constituting RLU#01 fail (as the state 22), and an example of a state after rebuilding processing according to the present embodiment is performed for temporary use of RLU#00 and RLU#01 (as the state 23).

The state 21 illustrated in FIG. 12 is the same as the state 1 illustrated in FIG. 5, and each of RLU#00 and RLU#01 is managed in accordance with RAID 6. Assume that DISK#13 and DISK#14 belonging to RLU#01 fail as indicated by hatching in the illustration of the state 22 in FIG. 12. The restoration control unit 230 determines another RLU in which data is triply redundant (i.e., data is managed in accordance with RAID 6), and combines the determined RLU and the RLU in which the HDDs fail.

Specifically, when DISK#13 and DISK#14 belonging to RLU#01 fail, the restoration control unit 230 makes the access control unit 220 perform the following rebuilding processing as indicated by the arrows in the illustration of the state 22 in FIG. 12. That is, the restoration control unit 230 requests the access control unit 220 to rebuild the data which have been stored in the failed DISK#13 and store the rebuilt data in the P-parity storage areas in RLU#00. In addition, the restoration control unit 230 requests the access control unit 220 to rebuild the data which have been stored in the failed DISK#14 and store the rebuilt data in the Q-parity storage areas in RLU#00.

When the rebuilding processing for RLU#01 is completed, the restoration control unit 230 combines RLU#00 and RLU#01 as indicated in the illustration of the state 23 in FIG. 12. That is, the restoration control unit 230 logically separates the failed DISK#13 and DISK#14 from RLU#01. In addition, the restoration control unit 230 logically separates from RLU#00 the P-parity storage areas and Q-parity storage areas in which the rebuilt data for RLU#01 are stored, and logically incorporates the logically separated P-parity storage areas and Q-parity storage areas into RLU#01.

Thus, the areas encircled by the bold lines in the illustration of the state 23 in FIG. 12 temporarily constitute RLU#01, and the restoration control unit 230 makes the access control unit 220 temporarily manage RLU#01 in accordance with RAID 6 after the P-parity storage areas and Q-parity storage areas are logically incorporated into RLU#01. In addition, the restoration control unit 230 temporarily manages RLU#00 in accordance with RAID 0 after the P-parity storage areas and Q-parity storage areas are logically separated from RLU#01.

The above processing for rebuilding the data and combining of the RLUs enables restoration of the triple redundancy in RLU#01 even after two HDDs constituting RLU#01 fail. On the other hand, since RLU#00, which has been used in accordance with RAID 6, is determined to be the refuge for the rebuilt data for RLU#01, the data redundancy in RLU#00 is lost. Therefore, it is desirable to choose as the refuge for the rebuilt data for RLU#01 an RLU to which a priority lower than the priority assigned to RLU#01 is assigned.

In the process of the transitions from the state 21 to the state 23 in the procedure of FIG. 12 according to the third embodiment, only the P-parity storage areas and the Q-parity storage areas in RLU#00 among the storage areas in DISK#00 to DISK#04 and DISK#10 to DISK#12 are overwritten with the rebuilt data, and no data is written in the other storage areas.

Therefore, as in the procedure of FIG. 5, the frequency of the operations of writing data in DISK#00 to DISK#04 and DISK#10 to DISK#12 performed in the procedure of FIG. 12 until the temporary use of RLU#00 in accordance with RAID 0 and RLU#01 in accordance with RAID 6 after the occurrence of the failures in DISK#13 and DISK#14 is low. That is, the processing burden imposed on the CPU 211 in the CM 201 until the temporary use of RLU#00 and RLU#01 in the procedure of FIG. 12 is light, so that the influence of the rebuilding processing in the procedure according to the present embodiment on the operations for accessing the HDDs in response to I/O requests from the host apparatus 400 is small. Thus, the procedure according to the present embodiment may prevent serious lowering of the speed of the access processing in response to the I/O requests.

Further, as illustrated in FIG. 12, RLU#00 in the state 23 is different from the state 21 only in that the P-parity storage areas and the Q-parity storage areas are logically separated from RLU#00. Therefore, the procedure for accessing RLU#00 in response to I/O requests from the host apparatus 400 needs not be greatly changed even when the transitions from the state to the state 23 occur. For example, when the host apparatus 400 requests readout of data from RLU#00 while RLU#00 and RLU#01 are in either of the state 21 and the state 23, the access control unit 220 reads out the requested data in an exactly identical manner. In addition, when the host apparatus 400 requests writing of data into RLU#00 while RLU#00 and RLU#01 are in either of the state 21 and the state 23, the access control unit 220 writes the requested data in an identical manner except that the access control unit 220 does not perform calculation and recording of the P parity and the Q parity in the state 23.

FIG. 13 illustrates an example of a state after copy-back processing according to the present embodiment is performed (as the state 24), an example of a state after data-restoration processing according to the present embodiment is performed (as the state 25), and an example of a state in which the RAID-6 level of each of RLU#00 and RLU#01 is restored for normal use (as the state 26).

After the failed HDDs DISK#13 and DISK#14 are respectively replaced with new HDDs, copy-back processing to RLU#01 is performed as indicated by the arrows in the illustration of the state 24 in FIG. 13, so that RLU#01 transitions to the state 24 (i.e., the data temporarily stored in the storage areas in RLU#00 are copied back to the storage areas in DISK#13 and DISK#14). Specifically, the restoration control unit 230 makes the access control unit 220 duplicate on the replacement of DISK#13 the data temporarily stored in the P-parity storage areas in RLU#00 and duplicate on the replacement of DISK#14 the data temporarily stored in the Q-parity storage areas in RLU#00. That is, the access control unit 220 reads out the data block in the P-parity storage area corresponding to each stripe number in RLU#00, and writes the data block in a position corresponding to the same stripe number in DISK#13 in RLU#01. In addition, the access control unit 220 reads out the data block in the Q-parity storage area corresponding to each stripe number in RLU#00, and writes the data block in a position corresponding to the same stripe number in DISK#13 in RLU#01.

When the copy-back processing is completed, the restoration control unit 230 makes RLU#00 and RLU#01 transition from the combined state to a separated state. At this time, the restoration control unit 230 incorporates the replacements of DISK#13 and DISK#14 into RLU#01, and logically separates the P-parity storage areas and the Q-parity storage areas in RLU#00 from RLU#01. In addition, the restoration control unit 230 logically incorporates the P-parity storage areas and the Q-parity storage areas in RLU#00 into RLU#00 again. Thus, the state 25 illustrated in FIG. 13, in which RLU#00 and RLU#01 are separated, is realized.

Thereafter, the restoration control unit 230 makes the access control unit 220 perform data-restoration processing for restoring the RAID level of RLU#00 to RAID-6. Specifically, the restoration control unit 230 requests the access control unit 220 to recalculate the P-parity data in RLU#00 and overwrite the P-parity storage areas in RLU#00 with the recalculated P-parity data. In addition, the restoration control unit 230 requests the access control unit 220 to recalculate the Q-parity data in RLU#00 and overwrite the Q-parity storage areas in RLU#00 with the recalculated Q-parity data. For example, the access control unit 220 recalculates the data of the P parity P0 and the Q parity Q0 by using the data blocks D0 to D2 stored in DISK#00 to DISK#02, and overwrites the data block in DISK#03 (originally allocated for the P parity P0) and DISK#04 (originally allocated for the Q parity Q0) in the same stripe as the data blocks D0 to D2 with the calculated data of the P parity P0 and the Q parity Q0. (In the illustration of the state 25 in FIG. 13, the data blocks on which the data restoration processing is performed are each encircled by dashed lines.)

When the data restoration as above is completed, the restoration control unit 230 changes the RAID level of each of RLU#00 and RLU#01 to RAID 6, and restores each of RLU#00 and RLU#01 to the normal state as indicated in the illustration of the state 26 in FIG. 13, which is identical to the state 21 illustrated in FIG. 12.

In the process for the transitions from the state 23 (illustrated in FIG. 12) to the state 26 (illustrated in FIG. 13), no data rearrangement is performed except that the data temporarily stored in the P-parity storage areas and the Q-parity storage areas in RLU#00 (in DISK#00 to DISK#04) are respectively copied back to the replacements of DISK#13 and DISK#14. Therefore, the frequency of access to data in DISK#00 to DISK#04 and DISK#10 to DISK#12 in the procedure of FIGS. 12 and 13 until the resumption of the RAID-6 operation of RLU#00 and RLU#01 after the replacement of DISK#13 and DISK#14 is lowered. That is, the processing burden imposed on the CPU 211 in the CM 201 until the resumption of the RAID-6 operation of RLU#00 and RLU#01 in the procedure of FIGS. 12 and 13 after the replacement of DISK#13 and DISK#14 is light, so that the influence of the processing for restoring the normal state in the procedure according to the present embodiment on the operations for accessing the HDDs in response to I/O requests from the host apparatus 400 is small.

3.2 Flow of Operations

Example of flows of operations performed by the storage system according to the third embodiment are explained below.

Figure 14:
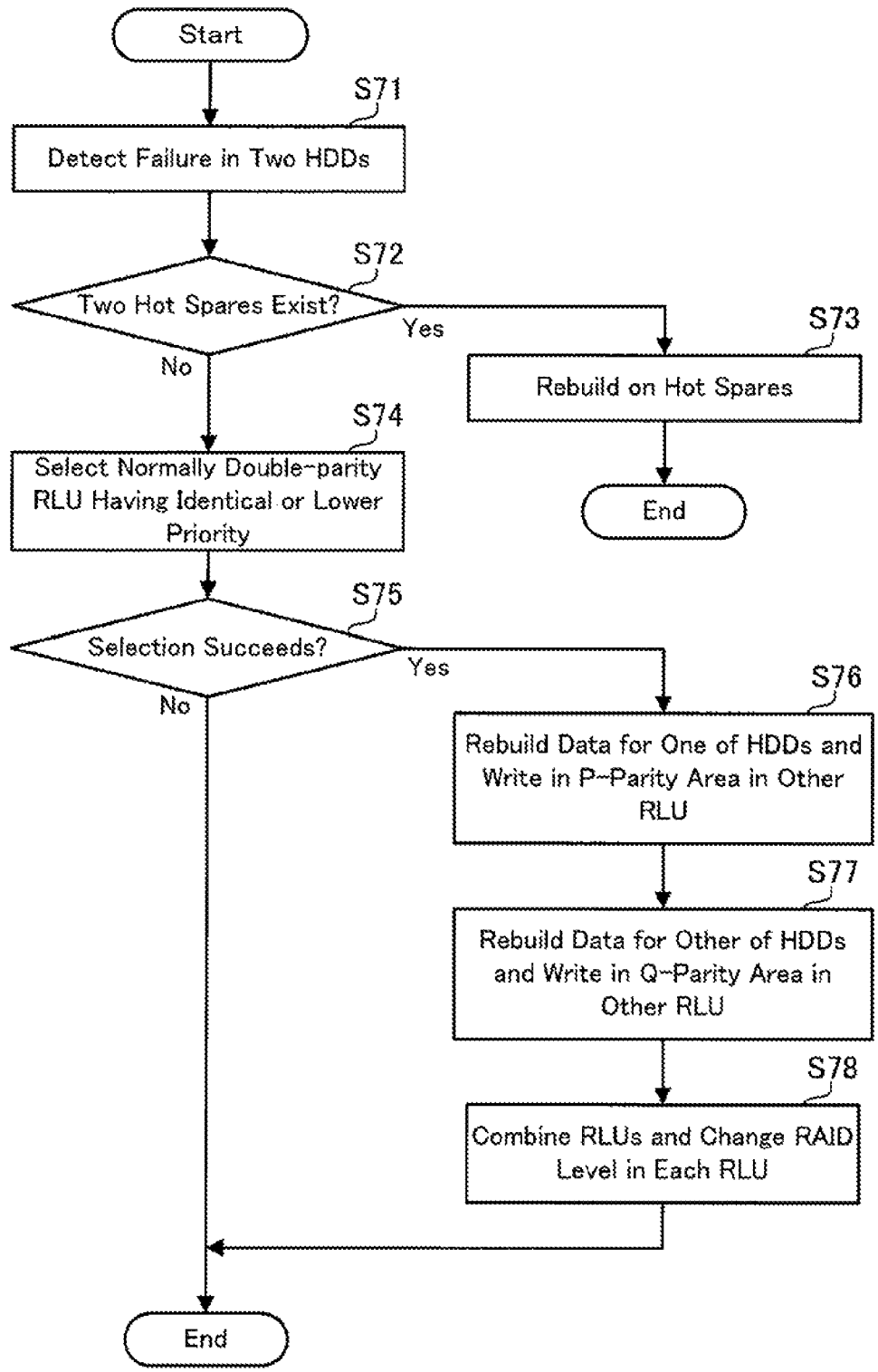
FIG. 14 indicates an example of a flow of operations which are performed when two of HDDs belonging to an RLU fail.

FIG. 14 indicates an example of a flow of operations which are performed when two of HDDs belonging to an RLU fail.

<Step S71> The restoration control unit 230 detects failures in the two of the HDDs (DISK#13 and DISK#14) belonging to RLU#01 in a similar manner to step S11 (in FIG. 9) in the second embodiment. Then, the restoration control unit 230 updates the information item "Disk Status" associated with each of DISK#13 and DISK#14 in the record 241 for RLU#01 in the RAID management table 240 from "Normal" to "Failed". In addition, the restoration control unit 230 updates the information item "RAID Status" in the record 241 for RLU#01 from "Double-parity Usable" to "Nonredundant".

<Step S72> The restoration control unit 230 determines whether or not two usable hot-spare disks exist in the DE 300. In the case where two usable hot-spare disks exist in the DE 300, i.e., when yes is determined in step S72, the restoration control unit 230 performs the operations in step S73. In the case where two usable hot-spare disks do not exist in the DE 300, i.e., when no is determined in step S72, the restoration control unit 230 performs the operations in step S74.

<Step S73> The restoration control unit 230 requests the access control unit 220 to rebuild the data which have been stored in the failed DISK#13 in RLU#01 and write the rebuilt data in a first one of the two usable hot-spare disks. In addition, the restoration control unit 230 requests the access control unit 220 to rebuild the data which have been stored in the failed DISK#14 in RLU#01 and write the rebuilt data in a second one of the two usable hot-spare disks. When the access control unit 220 completes the storing of the rebuilt data, the restoration control unit 230 logically separates DISK#13 and DISK#14 from RLU#01, and incorporates the two hot-spare disks into RLU#01. Thereafter, the restoration control unit 230 makes the access control unit 220 resume the use of RLU#01 in accordance with RAID 6.

<Step S74> The restoration control unit 230 searches the RAID management table 240 for an RLU as a refuge for rebuilt data by reference to one or more records 241 for one or more RLUs other than RLU#01 (in which the two HDDs fail) in the RAID management table 240. Specifically, the restoration control unit 230 searches for an RLU which is in normal RAID-6 operation (i.e., in which the P-parity storage areas and Q-parity storage areas are in normal states), has stripes smaller in number than RLU#01, and is lower than RLU#01 in priority. Then, the restoration control unit 230 determines one of the one or more extracted records 241 having the lowest priority to be the refuge for rebuilt data.

<Step S75> It is determined whether or not an RLU satisfying the above condition is determined in step S74. When an RLU satisfying the above conditions is determined in step S74, i.e., when yes is determined in step S75, the restoration control unit 230 performs the operations in step S76. On the other hand, when no RLU satisfying the above conditions is found in step S74, i.e., when no is determined in step S75, the restoration control unit 230 relinquishes the rebuilding processing for RLU#01. In this case, the data in RLU#01 is used and accessed in response to requests from the host apparatus 400 without data redundancy.

In the following explanations on steps S76 to S78, it is assumed that RLU#00 is determined to be the refuge for the rebuilt data for RLU#01.

<Step S76> The restoration control unit 230 updates the information item "RAID Status" in the record 241 for RLU#01 from "Nonredundant" to "Rebuilding Using Other RLU". In addition, the restoration control unit 230 updates the information item "Disk Status" associated with DISK#13 in the record 241 for RLU#01 to "Rebuilding", and records the RLU number of RLU#00 as the information item "Saving-side RLU Number" and "P Parity" as the information item "Saving-area Parity Type". Further, the restoration control unit 230 updates, in the record 241 for RLU#00, the information item "RAID Status" from "Double-parity Usable" to "Rebuilding for Other RLU" and the information item "Q-parity Status" from "Normal" to "Storing Saved Data". Furthermore, the restoration control unit 230 sets the RLU number of RLU#01 as the information item "P-area-using RLU Number" in the record 241 for RLU#00.

When the table-setting processing as above is completed, the restoration control unit 230 requests the access control unit 220 to rebuild the data which have been stored in the failed DISK#13 in RLU#01, and writes the rebuilt data in the P-parity storage areas in RLU#00.

<Step S77> After the access control unit 220 completes the writing of the rebuilt data into the P-parity storage areas in RLU#00, the restoration control unit 230 updates the information item "Disk Status" in the field for DISK#14 in the record 241 for RLU#01 to "Rebuilding", and records the RLU number of RLU#00 as the information item "Saving-side RLU Number" and "Q Parity" as the information item "Saving-area Parity Type". In addition, the restoration control unit 230 updates the information item "Q-parity Status" in the record 241 for RLU#00 from "Normal" to "Storing Saved Data", and records the RLU number of RLU#01 as the information item "Q-area-using RLU Number" in the record 241 for RLU#00.

When the table-setting processing as above is completed, the restoration control unit 230 requests the access control unit 220 to rebuild the data which have been stored in the failed DISK#14 in RLU#01 and write the rebuilt data in the Q-parity storage areas in RLU#00.

<Step S78> When the access control unit 220 completes the writing of the rebuilt data into the Q-parity storage areas in RLU#00, the restoration control unit 230 combines RLU#00 and RLU#01 and changes the RAID levels of RLU#00 and RLU#01 by performing the following table-setting processing.

The restoration control unit 230 updates the information item "RAID Status" in the record 241 for RLU#01 to "Saved in Other RLU", and the information item "Disk Status" associated with each of DISK#13 and DISK#14 in the record 241 for RLU#01 to "Saved". In addition, the restoration control unit 230 updates the information item "RAID Status" in the record 241 for RLU#00 to "Nonredundant".

When the above table-setting processing is completed, both types of parity storage areas in RLU#00 are logically separated from RLU#00, and the logically separated parity storage areas are logically incorporated into RLU#01. Therefore, RLU#00 and RLU#01 are combined, and the RAID level of each RLU is substantially changed. Specifically, when "RAID 6" is set in the information item "RAID Level" in the record 241 for RLU#00, and the information item "RAID Status" is updated to "Saved in Other RLU", the access control unit 220 controls RLU#00 substantially in accordance with RAID 0.

In the processing of FIG. 14, in step S74, an RLU to which a priority lower than the priority of RLU#01 is assigned is determined to be the refuge for the rebuilt data for RLU#01. Therefore, it is possible to avoid loss of data redundancy in one or more other RLUs to each of which a priority equal to or higher than the priority of RLU#01 is assigned, and therefore maintain data safety in the one or more other RLUs.

Figure 15:
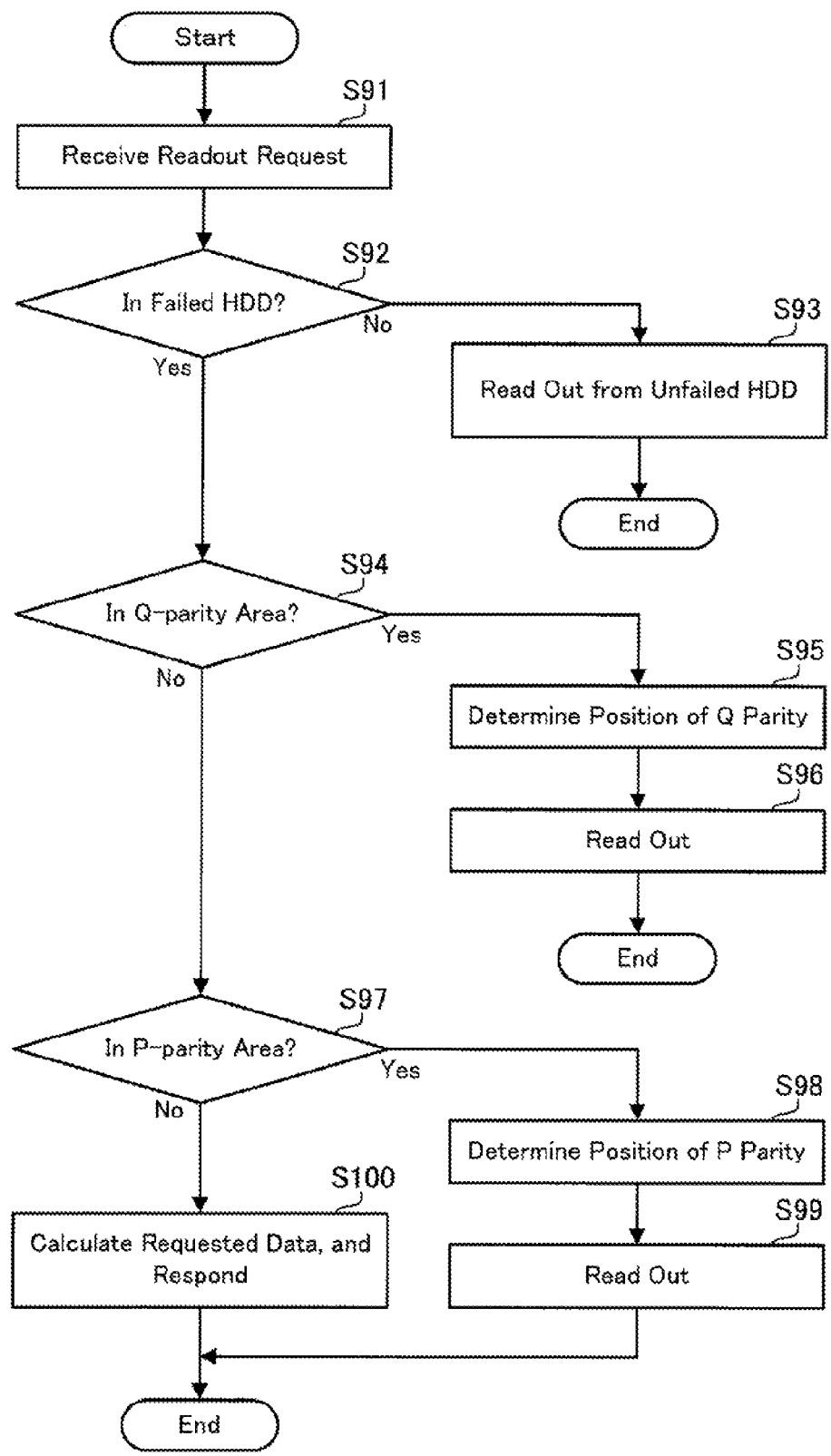
FIG. 15 indicates an example of a flow of operations which are performed when an I/O request is issued to the storage system in which the RLUs are combined.

FIG. 15 indicates an example of a flow of operations which are performed when an I/O request is issued to the storage system in which the RLUs are combined. Specifically, FIG. 15 indicates a flow of operations performed when the host apparatus 400 requests data readout from RLU#01 combined with RLU#00. The operations indicated in FIG. 15 are performed for each data block.

<Step S91> The access control unit 220 receives from the host apparatus 400 a request for readout of a data block from RLU#01.

<Step S92> The access control unit 220 determines whether or not the data block requested to be read out is recorded in a failed HDD (DISK#13 or DISK#14) among the HDDs (DISK#10 to DISK#14) which have belonged to RLU#01 in the initial state. In the case where the data block requested to be read out is recorded in a failed HDD, i.e., when yes is determined in step S92, the access control unit 220 performs the operations in step S94. On the other hand, in the case where the data block requested to be read out is recorded in an unfailed HDD (one of the unfailed HDDs DISK#10 to DISK#12), i.e., when no is determined in step S92, the access control unit 220 performs the operations in step S93.

<Step S93> The access control unit 220 reads out the requested data block from the unfailed HDD, and returns a response containing the requested data to the host apparatus 400.

<Step S94> The access control unit 220 determines whether or not the requested data block is saved in one of the Q-parity storage areas in another RLU. Specifically, the access control unit 220 refers to the record 241 for RLU#01, and determines whether or not "Q parity" is set as the information item "Saving-area Parity Type" associated with the HDD in which the requested data block has been stored before rebuilding.

In the case where "Q parity" is set as the information item "Saving-area Parity Type" as above, i.e., when yes is determined in step S94, the restoration control unit 230 performs the operations in step S95. In this case, the requested data block has been stored in DISK#14. On the other hand, in the case where "Q parity" is not set as the information item "Saving-area Parity Type" as above, i.e., when no is determined in step S94, the restoration control unit 230 performs the operations in step S97.

<Step S95> The access control unit 220 reads from the record 241 for RLU#01 the RLU number which is set as the information item "Saving-side RLU Number" associated with DISK#14. In this explanation, it is assumed that the RLU number of RLU#00 is set as the information item "Saving-side RLU Number" associated with DISK#14. Then, the access control unit 220 determines the position of the requested data block in the physical storage areas in RLU#00 in a manner similar to step S36 in FIG. 10. At this time, the position of the requested data block is indicated by the disk number Nq of the HDD which realizes the Q-parity storage area storing the requested data block.

<Step S96> The access control unit 220 reads out the requested data block from the position determined in step S95, and returns a response containing the requested data to the host apparatus 400.

<Step S97> The access control unit 220 determines whether or not the requested data block is saved in one of the P-parity storage areas in another RLU. Specifically, the access control unit 220 refers to the record 241 for RLU#01, and determines whether or not "P parity" is set as the information item "Saving-area Parity Type" associated with the HDD in which the requested data block has been stored before rebuilding.

In the case where "P parity" is set as the information item "Saving-area Parity Type" as above, i.e., when yes is determined in step S97, the restoration control unit 230 performs the operations in step S98. In this case, the requested data block has been stored in DISK#13. On the other hand, in the case where "P parity" is not set as the information item "Saving-area Parity Type" as above, i.e., when no is determined in step S97, the restoration control unit 230 performs the operations in step S100.

<Step S98> The access control unit 220 reads from the record 241 for RLU#01 the RLU number which is set as the information item "Saving-side RLU Number" associated with DISK#13. In this explanation, it is assumed that the RLU number of RLU#00 is set as the information item "Saving-side RLU Number" associated with DISK#13. Then, the access control unit 220 determines the position of the requested data block in the physical storage areas in RLU#00 in a manner similar to step S39 in FIG. 10. At this time, the position of the requested data block is indicated by the disk number Np of the HDD which realizes the P-parity storage area storing the requested data block.

<Step S99> The access control unit 220 reads out the requested data block from the position determined in step S98, and returns a response containing the requested data to the host apparatus 400.

<Step S100> The operations in step S100 are performed when no is determined in both of steps S94 and S97. That is, the operations in step S100 are performed when the processing for rebuilding the data which have been stored in DISK#13 or DISK#14 has not yet been completed and the requested data may be stored in neither of the P-parity storage area and Q-parity storage area in the RLU used for saving the rebuilt data.

In the above case, in a similar manner to step S41 in FIG. 10, the access control unit 220 calculates the values of the requested data block on the basis of the data in the DISK#10, DISK#11, and DISK#12 in the stripe having the stripe number Ns. At this time, the data in DISK#10, DISK#11, and DISK#12 in the stripe having the stripe number Ns may include three data blocks, or one or more data blocks and one or both of the P parity and the Q parity. Thereafter, the access control unit 220 returns to the host apparatus 400 a response containing the requested data which is calculated as above.

Figure 16:
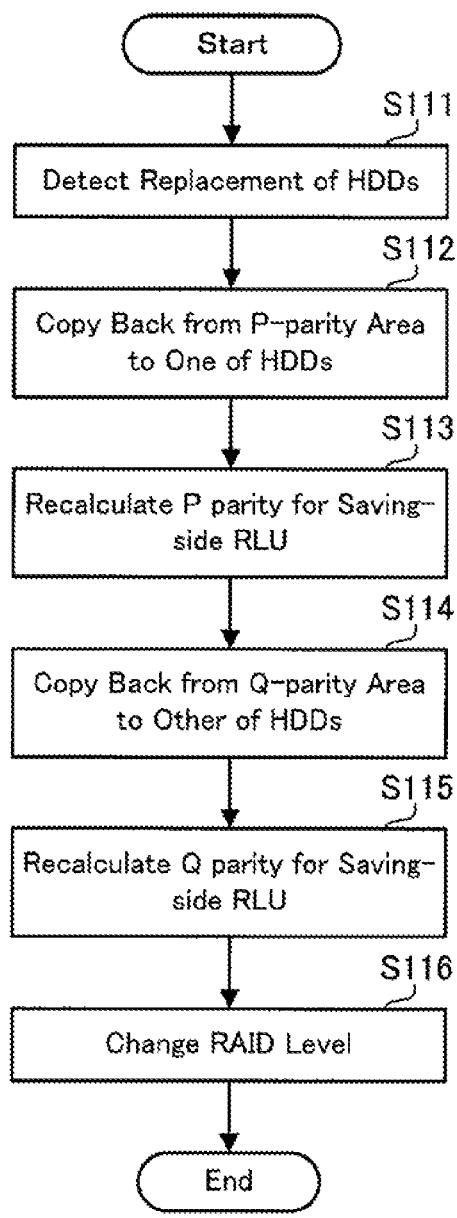
FIG. 16 indicates an example of a flow of operations performed after the failed HDDs are replaced.

FIG. 16 indicates an example of a flow of operations performed after the failed HDDs are replaced. In the following explanations, it is assumed that DISK#13 and DISK#14 belonging to RLU#01 are replaced.

<Step S111> The restoration control unit 230 detects replacement of DISK#13 and DISK#14 in the two of the HDDs (DISK#13 and DISK#14) belonging to RLU#01 in a similar manner to step S51 (in FIG. 11) in the second embodiment.

<Step S112> The restoration control unit 230 determines an RLU (RLU#01 in this example) to which the replaced DISK#13 and DISK#14 belong, and refers to the record 241 for the determined RLU in the RAID management table 240. Then, the restoration control unit 230 extracts from the record 241 for RLU#01 an HDD (DISK#13 in this example) for which "P Parity" is set as the information item "Saving-area Parity Type", and updates the information item "Disk Status" associated with the extracted HDD in the record 241 for RLU#01 to "Copying Back". In addition, the restoration control unit 230 updates the information item "RAID Status" in the record 241 for the determined RLU (RLU#01) to "Copying Back from Other RLU". Further, the restoration control unit 230 refers to the record 241 for the RLU (RLU#00 in this example) indicated by the information item "Saving-side RLU Number" associated with DISK#13, and updates the information item "RAID Status" in the record 241 for the RLU (RLU#00) to "Copying Back to Other RLU".

When the above operations for setting the RAID management table 240 are completed, the restoration control unit 230 requests the access control unit 220 to start processing for copying data from the P-parity storage areas in RLU#00 back to DISK#13 in RLU#01. Then, the access control unit 220 reads out data from the P-parity storage areas in RLU#00, and writes the data back to the replacement of DISK#13.

When the access control unit 220 completes the processing for copying back from the P-parity storage areas in RLU#00, the restoration control unit 230 updates, in the record 241 for RLU#01, the information item "Disk Status" associated with DISK#13 to "Normal", and deletes the information which is set as the information items "Saving-side RLU Number" and "Saving-area Parity Type" associated with DISK#13.

<Step S113> The restoration control unit 230 requests the access control unit 220 to recalculate the P parity in RLU#00. Then, the access control unit 220 recalculates the P parity on the basis of data blocks stored in DISK#00 to DISK#04, and overwrites the P-parity storage areas in RLU#00 with the recalculated P parity.

When the overwriting of all the P-parity storage areas in RLU#00 is completed, the restoration control unit 230 updates the information item "P-parity Status" in the record 241 for RLU#00 to "Normal", and deletes the RLU number of RLU#01 in the information item "P-area-using RLU Number" in the record 241 for RLU#00.

<Step S114> The restoration control unit 230 extracts from the record 241 for RLU#01 an HDD (DISK#14 in this example) for which "Q Parity" is set as the information item "Saving-area Parity Type", and updates the information item "Disk Status" associated with the extracted HDD in the record 241 for RLU#01 to "Copying Back".

When the above operation for setting the RAID management table 240 is completed, the restoration control unit 230 requests the access control unit 220 to start processing for copying data from the Q-parity storage areas in RLU#00 back to DISK#14 in RLU#01. Then, the access control unit 220 reads out data from the Q-parity storage areas in RLU#00, and writes the data back to the replacement of DISK#14.

When the access control unit 220 completes the processing for copying back from the Q-parity storage areas in RLU#00, the restoration control unit 230 updates, in the record 241 for RLU#01, the information item "Disk Status" associated with DISK#14 to "Normal", and deletes the information which is set as the information items "Saving-side RLU Number" and "Saving-area Parity Type" associated with DISK#14.

<Step S115> The restoration control unit 230 requests the access control unit 220 to recalculate the Q parity in RLU#00. Then, the access control unit 220 recalculates the Q parity on the basis of data blocks stored in DISK#00 to DISK#04, and overwrites the Q-parity storage areas in RLU#00 with the recalculated Q parity.

When the overwriting of all the Q-parity storage areas in RLU#00 is completed, the restoration control unit 230 updates the information item "Q-parity Status" in the record 241 for RLU#00 to "Normal", and deletes the RLU number of RLU#01 in the information item "Q-area-using RLU Number" in the record 241 for RLU#00.

<Step S116> The restoration control unit 230 changes the RAID levels of RLU#00 and RLU#01 by performing the following table-setting processing. That is, the restoration control unit 230 updates the information item "RAID Status" in the record 241 for RLU#01 to "Double-parity Usable", so that RLU#01 becomes usable in accordance with RAID 6 as before the failures in DISK#13 and DISK#14. In addition, the restoration control unit 230 updates the information item "RAID Status" in the record 241 for RLU#00 to "Double-parity Usable", so that RLU#00 also becomes usable in accordance with RAID 6 as before the failures in DISK#13 and DISK#14.

In the processing of FIG. 16, the processing for copying back from the Q-parity storage areas to DISK#14 is performed after the processing for copying back from the P-parity storage areas to DISK#13. However, the processing for copying back from the Q-parity storage areas to DISK#14 may be performed before or in parallel with the processing for copying back from the P-parity storage areas to DISK#13.

4. Fourth Embodiment

The fourth embodiment is explained below. The fourth embodiment is different from the second embodiment in that the processing functions of each the CMs are modified as illustrated in FIG. 17.

4.1 Controller Modules

Figure 17:
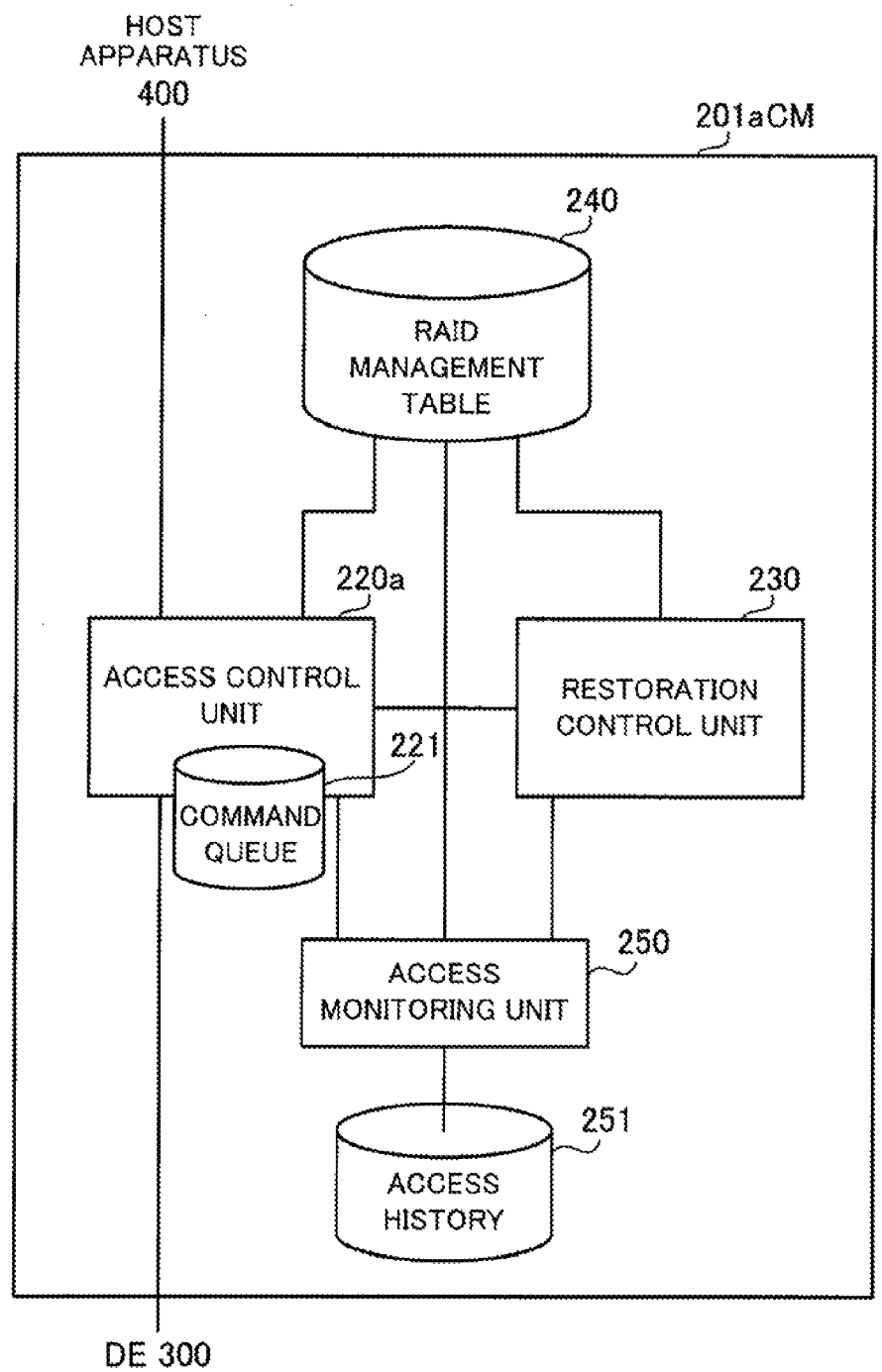
FIG. 17 illustrates examples of processing functions of one of the CMs according to a fourth embodiment.

FIG. 17 illustrates examples of processing functions of one of the CMs (CM 201a) according to the fourth embodiment. In FIG. 17, the same elements as FIG. 4 bear the same reference numbers as FIG. 4. In the fourth embodiment, the CM 201a has an access control unit 220a, a restoration control unit 230, and an access monitoring unit 250. The processing function of each of the access control unit 220a, the restoration control unit 230, and the access monitoring unit 250 are realized, for example, by the CPU 211 in the CM 201 executing a predetermined program. In addition, the SSD 213 in the CM 201a stores an access history 251 as well as the RAID management table 240.

The access control unit 220a temporarily stores in a command queue 221 I/O request commands which are received from the host apparatus 400, and processes the I/O request commands in order of storing in the command queue 221. The command queue 221 is realized, for example, in the RAM 212 in the CM 201a while the access control unit 220a is in operation. In addition, before the restoration control unit 230 performs processing for accessing a first RLU combined with a second RLU in response to a readout request received from the host apparatus 400, the restoration control unit 230 inquires of the access monitoring unit 250 the number of operations of accessing the second RLU performed during a predetermined period in the past. The restoration control unit 230 changes the way of reading out data requested by the host apparatus 400, according to the number of access operations which is informed by the access monitoring unit 250 and the number of I/O request commands currently stored in the command queue 221. The other operations performed by the access control unit 220a are similar to the operations performed by the access control unit 220 in the second embodiment illustrated in FIG. 4.

The access monitoring unit 250 monitors the operations of accessing the HDDs in response to I/O requests received from the host apparatus 400, and stores as the access history 251 a history of the monitored operations of accessing the HDDs. The access monitoring unit 250 records the access history 251 for each RLU by reference to the RAID management table 240. In addition, in response to a request from the restoration control unit 230, the access monitoring unit 250 calculates the number of operations of accessing a predetermined RLU performed during a predetermined period in the past, and informs the restoration control unit 230 of the calculated number.

4.2 Flow of Operations

Figure 18:
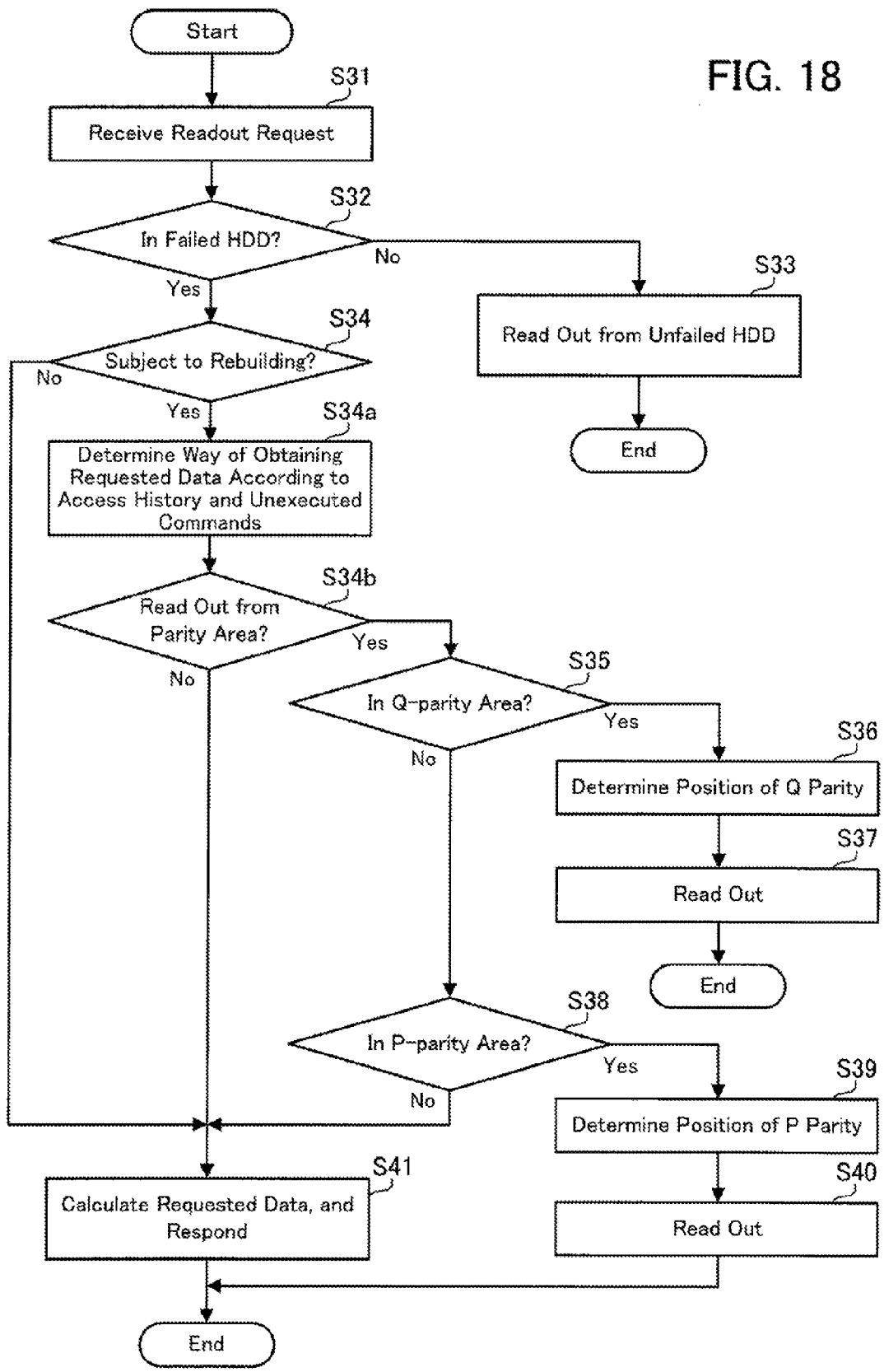
FIG. 18 indicates an example of a flow of operations which are performed when an I/O request is issued to the storage system according to the fourth embodiment in which the RLUs are combined.

FIG. 18 indicates an example of a flow of operations which are performed when an I/O request is issued to the storage system according to the fourth embodiment in which the RLUs are combined. Specifically, FIG. 18 indicates a flow of operations performed when the host apparatus 400 requests data readout from RLU#01 combined with RLU#00, as FIG. 10. In FIG. 18, the same step numbers as FIG. 10 are assigned to the steps similar to FIG. 10, respectively. The operations indicated in FIG. 18 are performed for each data block. Since the flow of operations in FIG. 18 includes steps S34a and S34b in addition to the steps in FIG. 10, only the additional steps S34a and S34b are explained below.

<Step S34a> The access control unit 220a determines the disk number of an HDD for which "Saved" is set as the information item "Disk Status" in the record 241 for RLU#01. In this explanation, it is assumed that "Saved" is set as the information item "Disk Status" associated with DISK#13 in the record 241 for RLU#01.

The access control unit 220a reads out the RLU number which is set as the information item "Saving-side RLU Number" associated with DISK#13. In this explanation, it is assumed that the RLU number of RLU#00 is set as the information item "Saving-side RLU Number" associated with DISK#13 in the record 241 for RLU#01. The access control unit 220a determines, before transmission of the requested data, whether to read out from a P-parity storage area in the saving-side RLU (RLU#00 in this example) the data requested to be read out, or to calculate the requested data on the basis of the data stored in the unfailed HDDs, DISK#10, DISK#11, and DISK#12 in RLU#01.

Specifically, the access control unit 220a recognizes the number of operations of accessing RLU#00 performed during a predetermined period in the past, by inquiring of the access monitoring unit 250 the number of operations of accessing RLU#00 performed during the predetermined period in the past. In addition, the access control unit 220a calculates the number of I/O request commands to access RLU#00 which are currently stored in the command queue 221 and have not yet been executed. In the case where the number of operations of accessing RLU#00 performed during the predetermined period in the past is smaller than a first predetermined number, and the number of I/O request commands to access RLU#00 which are currently stored in the command queue 221 and have not yet been executed is smaller than a second predetermined number, the access control unit 220a determines to read out the requested data from the P-parity storage area in RLU#00 (i.e., the access control unit 220a determines to perform the operations from step S35). This is because it is possible to consider that the speed of I/O processing performed on RLU#00 is not greatly lowered by further performing an operation of reading out the data from the P-parity storage area in RLU#00, in the case where the number of operations of accessing RLU#00 performed during the predetermined period in the past is smaller than the first predetermined number, and the number of I/O request commands to access RLU#00 which are currently stored in the command queue 221 and have not yet been executed is smaller than the second predetermined number. On the other hand, in the case where the number of operations of accessing RLU#00 performed during the predetermined period in the past is equal to or greater than the first predetermined number, or the number of I/O request commands to access RLU#00 which are currently stored in the command queue 221 and have not yet been executed is equal to or greater than the second predetermined number, the speed of I/O processing performed on RLU#00 may be greatly lowered by further performing an operation of reading out the data from the P-parity storage area in RLU#00. Therefore, at least in the above case, the access control unit 220a determines to calculate the requested data on the basis of the data stored in the unfailed HDDs, DISK#10, DISK#11, and DISK#12 in RLU#01 (i.e., the access control unit 220a determines to perform step S41).

<Step S34b> When the access control unit 220a determines in step S34a to read out from the P-parity storage area in the saving-side RLU (RLU#00 in this example) the requested data, i.e., when the access control unit 220a determines yes in step S34b, the access control unit 220a performs the operations in step S35. On the other hand, when the access control unit 220a determines in step S34a to calculate the requested data on the basis of the data stored in the unfailed HDDs, DISK#10, DISK#11, and DISK#12 in RLU#01, i.e., when the access control unit 220a determines no in step S34b, the access control unit 220a performs the operations in step S41.

According to the processing of FIG. 18 in which the above steps 34a and S34b are added, when the host apparatus 400 requests the storage system to read out a data block which has been stored in a failed HDD, it is possible to automatically select the way of obtaining the requested data so that the influence on the speed of I/O processing performed on the saving-side RLU (RLU#00) is minimized.

Although the way of obtaining the requested data is determined in steps S34a and S34b on the basis of the number of operations of accessing RLU#00 performed during the predetermined period in the past and the number of I/O request commands to access RLU#00 which are currently stored in the command queue 221 and have not yet been executed, alternatively, it is possible to determine the way of obtaining the requested data on the basis of only one of the number of operations of accessing RLU#00 performed during the predetermined period in the past and the number of I/O request commands to access RLU#00 which are currently stored in the command queue 221 and have not yet been executed. For example, the access control unit 220a may perform the operations from step S35 when the number of operations of accessing RLU#00 performed during the predetermined period in the past is smaller than a third predetermined number, and perform the operations in step S41 when the number of operations of accessing RLU#00 performed during the predetermined period in the past is equal to or greater than the third predetermined number. Alternatively, the access control unit 220a may perform the operations from step S35 when the number of I/O request commands to access RLU#00 which are currently stored in the command queue 221 and have not yet been executed is smaller than a fourth predetermined number, and perform the operations in step S41 when the number of I/O request commands to access RLU#00 which are currently stored in the command queue 221 and have not yet been executed is equal to or greater than the fourth predetermined number.

Further alternatively, the way of obtaining the requested data may be determined in advance by the user for each RLU, instead of being determined on the basis of the number of operations of accessing RLU#00 performed during the predetermined period in the past and/or the number of I/O request commands to access RLU#00 which are currently stored in the command queue 221 and have not yet been executed.

Furthermore, the operations in steps S34a and S34b may also be applied to the flow of operations in the third embodiment. For example, the operations in steps S34a and S34b may be inserted between the operation in step S92 and the operation in step S94 in FIG. 15. In this case, the access control unit 220a performs the operation in step S94 when the access control unit 220 determines to read out from a P-parity storage area in the saving-side RLU the data requested to be read out (i.e., when yes is determined in step S34b), and performs the operation in step S100 when the access control unit 220 determines to calculate the requested data on the basis of the data stored in the unfailed HDDs, DISK#10, DISK#11, and DISK#12 in RLU#01 (i.e., when no is determined in step S34b).

In the storage systems, the storage control apparatuses, and the storage control methods according to the embodiments disclosed in this specification, it is possible to restore the data redundancy in the first logical storage area. In addition, it is unnecessary to separate a storage device constituting the second logical storage area from the second logical storage area.

5. Additional Matters

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions and alterations could be made hereto without departing from the spirit and scope of the invention.

What is claimed is:

1. A storage system comprising:
   first storage devices constituting a first logical storage area;
   second storage devices constituting a second logical storage area; and
   a storage control apparatus configured to perform a procedure including:
      controlling processing for accessing first data stored in the first logical storage area and second data stored in the second logical storage area,
      managing the first logical storage area and the second logical storage area in such a manner that the first data stored in the first logical storage area and the second data stored in the second logical storage area have redundancy, and first parity data for the first data are stored in first parity storage areas which are distributedly arranged in more than one of the first storage devices, and second parity data for the second data are stored in second parity storage areas which are distributedly arranged in more than one of the second storage devices, and
      when failure occurs in one or more of the first storage devices constituting part of the first logical storage area, generating part of the first data which are stored, before the failure, in the one or more of the first storage devices, and writing the part of the first data over part of the second parity data stored in at least part of the second parity storage areas in the second logical storage area.

2. The storage system according to claim 1, wherein the procedure further includes, after the one or more of the first storage devices are replaced with one or more replacements, transferring the part of the first data stored in the at least part of the second parity storage areas to the one or more replacements of the one or more of the first storage devices, calculating at least part of the second parity data which are stored in the at least part of the second parity storage areas before the storing of the part of the first data, on a basis of part of the second data stored in the second logical storage area other than the at least part of the second parity storage areas, and writing the at least part of the second parity data in the at least part of the second parity storage areas.

3. The storage system according to claim 1, wherein the procedure further includes selecting as the second logical storage area a designated logical storage area to which a priority equal to or lower than a priority assigned to the first logical storage area is assigned, when the failure occurs in the one or more of the first storage devices and the second logical storage area stores the second data with triple redundancy.

4. The storage system according to claim 1, wherein the procedure further includes selecting as the second logical storage area a designated logical storage area to which a priority lower than a priority assigned to the first logical storage area is assigned, when the failure occurs in the one or more of the first storage devices and the second logical storage area stores the second data with double redundancy.

5. The storage system according to claim 1, wherein the procedure further includes, after the failure occurs in the one or more of the first storage devices and the part of the first data is stored in the at least part of the second parity storage areas, incorporating into the first logical storage area the at least part of the second parity storage areas as one or more refuges from the one or more of the first storage devices, resuming managing of the first logical storage area while maintaining redundancy in the first data, separating the at least part of the second parity storage areas from the second logical storage area, and resuming managing of the second logical storage area with lowered redundancy in the second data.

6. The storage system according to claim 5, wherein the procedure further includes determining, according to a history of requests for access to the second logical storage area received from a host apparatus during a predetermined past period, whether to read out requested data from the at least part of the second parity storage areas, or to calculate the requested data a basis of data stored in the first storage devices other than the one or more of the first storage devices, when the requested data is stored, before the failure, in the one or more of the first storage devices and is requested to be read out by the host apparatus under a condition that the at least part of the second parity storage areas is incorporated into the first logical storage area.

7. The storage system according to claim 5, wherein the procedure further includes determining, according to a number of unexecuted requests for access to the second logical storage area received from a host apparatus, whether to read out requested data from the at least part of the second parity storage areas, or to calculate the requested data on a basis of data stored in the first storage devices other than the one or more of the first storage devices, when the requested data is stored, before the failure, in the one or more of the first storage devices and is requested to be read out by the host apparatus under a condition that the at least part of the second parity storage areas is incorporated into the first logical storage area.

8. A storage control method comprising:
controlling processing for accessing first data stored in a first logical storage area and second data stored in a second logical storage area, where the first logical storage area is constituted by first storage devices and the second logical storage area is constituted by second storage devices;
managing the first logical storage area and the second logical storage area in such a manner that the first data stored in the first logical storage area and the second data stored in the second logical storage area have redundancy, and first parity data for the first data are stored in first parity storage areas which are distributedly arranged in more than one of the first storage devices, and second parity data for the second data are stored in second parity storage areas which are distributedly arranged in more than one of the second storage devices; and
when failure occurs in one or more of the first storage devices constituting part of the first logical storage area, generating part of the first data which are stored, before the failure, in the one or more of the first storage devices, and writing the part of the first data over part of the second parity data in at least part of the second parity storage areas in the second logical storage area.

9. The storage control method according to claim 8, further comprising:
after the one or more of the first storage devices are replaced with one or more replacements, transferring the part of the first data stored in the at least part of the second parity storage areas to the one or more replacements of the one or more of the first storage devices, calculating at least part of the second parity data which are stored in the at least part of the second parity storage areas before the storing of the part of the first data, on a basis of part of the second data stored in the second logical storage area other than the at least part of the second parity storage areas, and writing the at least part of the second parity data in the at least part of the second parity storage areas.

10. The storage control method according to claim 8, further comprising:
selecting as the second logical storage area a designated logical storage area to which a priority equal to or lower than a priority assigned to the first logical storage area is assigned, when the failure occurs in the one or more of the first storage devices and the second logical storage area stores the second data with triple redundancy.

11. The storage control method according to claim 8, further comprising:
selecting as the second logical storage area a designated logical storage area to which a priority lower than a priority assigned to the first logical storage area is assigned, when the failure occurs in the one or more of the first storage devices and the second logical storage area stores the second data with double redundancy.

12. The storage control method according to claim 8, further comprising:
after the failure occurs in the one or more of the first storage devices and the part of the first data is stored in the at least part of the second parity storage areas, incorporating into the first logical storage area the at least part of the second parity storage areas as one or more refuges from the one or more of the first storage devices, resuming managing of the first logical storage area while maintaining redundancy in the first data, separating the at least part of the second parity storage areas from the second logical storage area, and resuming managing of the second logical storage area with lowered redundancy in the second data.

13. The storage control apparatus according to claim 12, further comprising:
determining, according to a history of requests for access to the second logical storage area received from a host apparatus during a predetermined past period, whether to read out requested data from the at least part of the second parity storage areas, or to calculate the requested data on a basis of data stored in the first storage devices other than the one or more of the first storage devices, when the requested data is stored, before the failure, in the one or more of the first storage devices and is requested to be read out by the host apparatus under a condition that the at least part of the second parity storage areas is incorporated into the first logical storage area.

14. The storage control method according to claim 12, further comprising:
determining, according to a number of unexecuted requests for access to the second logical storage area received from a host apparatus, whether to read out requested data from the at least part of the second parity storage areas, or to calculate the requested data on a basis of data stored in the first storage devices other than the one or more of the first storage devices, when the requested data is stored, before the failure, in the one or more of the first storage devices and is requested to be read out by the host apparatus under a condition that the at least part of the second parity storage areas is incorporated into the first logical storage area.

15. A storage control apparatus comprising a processor configured to perform a procedure including:
controlling processing for accessing first data stored in a first logical storage area and second data stored in a second logical storage area, where the first logical storage area is constituted by first storage devices and the second logical storage area is constituted by second storage devices;
managing the first logical storage area and the second logical storage area in such a manner that the first data stored in the first logical storage area and the second data stored in the second logical storage area have redundancy, and first parity data for the first data are stored in first parity storage areas which are distributedly arranged in more than one of the first storage devices, and second parity data for the second data are stored in second parity storage areas which are distributedly arranged in more than one of the second storage devices; and
when failure occurs in one or more of the first storage devices constituting part of the first logical storage area, generating part of the first data which are stored, before the failure, in the one or more of the first storage devices, and writing the part of the first data over part of the second parity data in at least part of the second parity storage areas in the second logical storage area.

16. The storage control apparatus according to claim 15, wherein the procedure further includes, after the one or more of the first storage devices are replaced with one or more replacements, transferring the part of the first data stored in the at least part of the second parity storage areas to the one or more replacements of the one or more of the first storage devices, calculating at least part of the second parity data which are stored in the at least part of the second parity storage areas before the storing of the part of the first data, on a basis of part of the second data stored in the second logical storage area other than the at least part of the second parity storage areas, and writing the at least part of the second parity data in the at least part of the second parity storage areas.

17. The storage control apparatus according to claim 15, wherein the procedure further includes, after the failure occurs in the one or more of the first storage devices and the part of the first data is stored in the at least part of the second parity storage areas, incorporating into the first logical storage area the at least part of the second parity storage areas as one or more refuges from the one or more of the first storage devices, resuming managing of the first logical storage area while maintaining redundancy in the first data, separating the at least part of the second parity storage areas from the second logical storage area, and resuming managing of the second logical storage area with lowered redundancy in the second data.

18. The storage control apparatus according to claim 17, wherein the procedure further includes determining, according to a history of requests for access to the second logical storage area received from a host apparatus during a predetermined past period, whether to read out requested data from the at least part of the second parity storage areas, or to calculate the requested data on a basis of data stored in the first storage devices other than the one or more of the first storage devices, when the requested data is stored, before the failure, in the one or more of the first storage devices and is requested to be read out by the host apparatus under a condition that the at least part of the second parity storage areas is incorporated into the first logical storage area.

19. The storage control apparatus according to claim 17, wherein the procedure further includes determining, according to a number of unexecuted requests for access to the second logical storage area received from a host apparatus, whether to read out requested data from the at least part of the second parity storage areas, or to calculate the requested data on a basis of data stored in the first storage devices other than the one or more of the first storage devices, when the requested data is stored, before the failure, in the one or more of the first storage devices and is requested to be read out by the host apparatus under a condition that the at least part of the second parity storage areas is incorporated into the first logical storage area.

* * * * *